US011061676B2

(12) United States Patent
Jacob et al.

(10) Patent No.: US 11,061,676 B2
(45) Date of Patent: Jul. 13, 2021

(54) SCATTER GATHER USING KEY-VALUE STORE

(71) Applicant: International Business Machines Corporation, Armonk, NY (US)

(72) Inventors: Philip Jacob, Congers, NY (US); Philip Neil Strenski, Yorktown Heights, NY (US); Charles Johns, Austin, TX (US); Lars Schneidenbach, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 16/392,943

(22) Filed: Apr. 24, 2019

(65) Prior Publication Data

US 2020/0341764 A1    Oct. 29, 2020

(51) Int. Cl.
  *G06F 7/00* (2006.01)
  *G06F 9/30* (2018.01)
  *G06F 12/0806* (2016.01)
  *G06F 13/16* (2006.01)

(52) U.S. Cl.
  CPC ...... *G06F 9/30036* (2013.01); *G06F 9/30043* (2013.01); *G06F 12/0806* (2013.01); *G06F 13/1673* (2013.01)

(58) Field of Classification Search
  CPC ............. G06F 9/30036; G06F 9/30043; G06F 12/0806; H04F 13/1673
  USPC .................................................. 707/600–899
  See application file for complete search history.

(56) References Cited

U.S. PATENT DOCUMENTS

| 8,510,759 | B1 | 8/2013 | Mcgowan |
| 9,069,671 | B2 | 6/2015 | Hughes et al. |
| 9,323,672 | B2 * | 4/2016 | Kim .................... G06F 12/0815 |
| 9,785,436 | B2 | 10/2017 | Grochowski et al. |
| 9,971,524 | B1 | 5/2018 | Bruce et al. |
| 10,049,061 | B2 | 8/2018 | Fleischer et al. |
| 2007/0011398 | A1 | 1/2007 | Van Niekerk |
| 2009/0037450 | A1 | 2/2009 | Jia et al. |
| 2017/0357514 | A1 | 12/2017 | Ould-Ahmed-Vall et al. |

(Continued)

OTHER PUBLICATIONS

Hilewitz et al.; "Fast Bit Gather, Bit Scatter and Bit Permutation Instructions for Commodity Microprocessors", Published Jun. 4, 2008.

(Continued)

*Primary Examiner* — Isaac M Woo
(74) *Attorney, Agent, or Firm* — Harrington & Smith

(57) ABSTRACT

Scatter gather operation(s) are performed by accessing a shared memory that is shared amongst nodes interconnected through network(s) and having a CNS shared amongst the nodes. Data is gathered from multiple processes at corresponding multiple nodes into location(s) in the CNS, and tuple(s) having a same tuple name are created in the CNS. The tuple(s) have information referencing the gathered data in the location(s). Alternatively, data that has been gathered using the same tuple name is scattered to multiple processes participating in the CNS. The scattering uses the tuple(s) in the CNS, and is performed from the location(s) into other location(s) at one or multiple nodes for one or multiple processes at the corresponding one or multiple nodes. Both the gathering data and the scattering data may also be performed.

20 Claims, 22 Drawing Sheets

(56) References Cited

U.S. PATENT DOCUMENTS

2018/0113635 A1 4/2018 Simionescu et al.
2018/0150542 A1 5/2018 Brown et al.
2018/0165381 A1 6/2018 Venkatesh et al.

OTHER PUBLICATIONS

Seshadri et al.; "Gather-Scatter DRAM: In-DRAM Address Translation to Improve the Spatial Locality of Non-Unit Strided Accesses", Dec. 5-9, 2015.
Marks, Kevin; "An NVM Express Tutorial", retrieved Nov. 27, 2018.
Deshpande et al.; "Scatter-Gather Live Migration of Virtual Machines", retrieved Nov. 27, 2018.
Bryon Moyer, "How Does Scatter/Gather Work?", Electronic Engineering, Feb. 9, 2017 (downloaded from https://www.eejournal.com/article/20170209-scatter-gather/ on Jan. 30, 2019).
Think Python/Tuples, Wikibooks, page was last edited on Aug. 31, 2010, at 16:41 (downloaded from https://en.wikibooks.org/wiki/Think_Python/Tuples on Jan. 30, 2019).
IBM U.S. Appl. No. 16/216,863, filed Dec. 11, 2018.
IBM U.S. Appl. No. 16/217,905, filed Dec. 12, 2018.
IBM U.S. Appl. No. 16/218,118, filed Dec. 12, 2018.
IBM U.S. Appl. No. 16/215,244, filed Dec. 10, 2018.
IBM U.S. Appl. No. 16/218,367, filed Dec. 12, 2018.

\* cited by examiner

Routing a Coordination Namespace Access Request to a Node
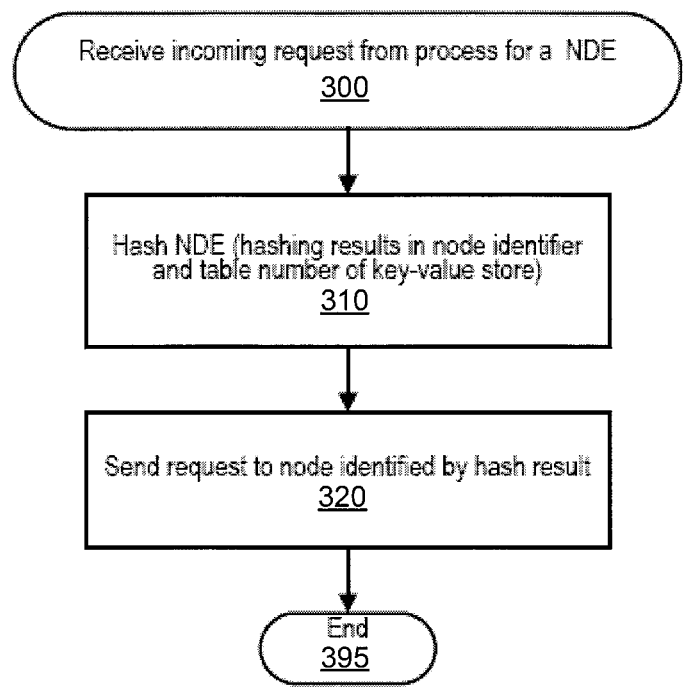
FIG. 3A
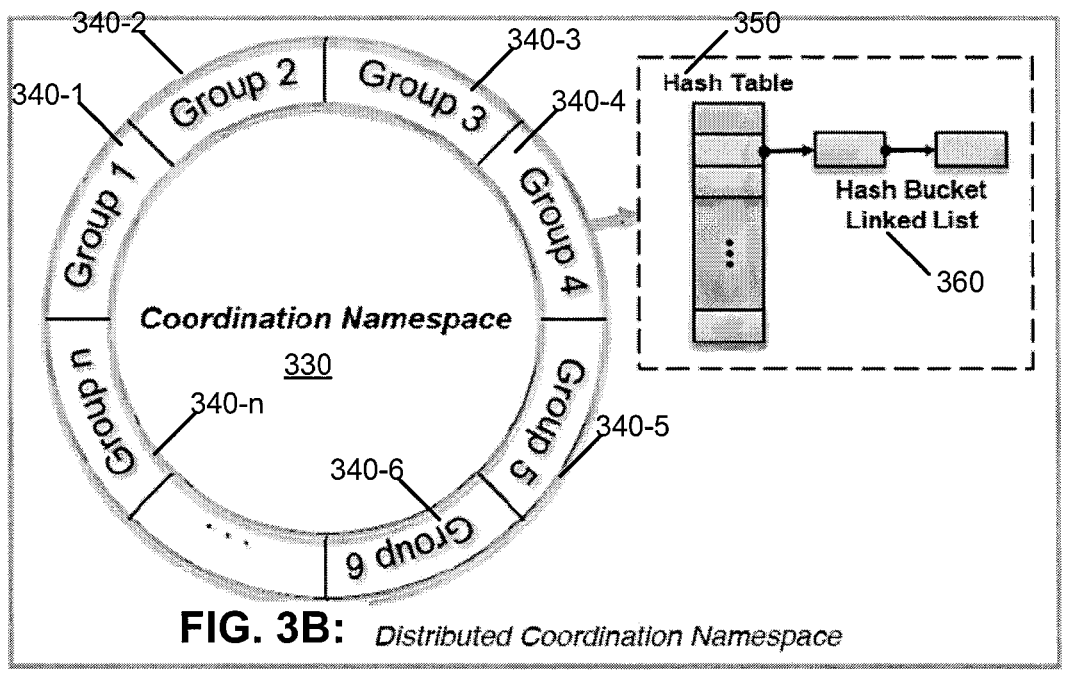
FIG. 3B: *Distributed Coordination Namespace*

| Software API | Hardware opcode | Description |
|---|---|---|
| csOut | csout | Creates a new tuple in CNS |
| csOuta | csout | Creates a new tuple but asynchronous from application stand point |
| csIn | csin | Retrieves and removes a matching tuple from CNS |
| csIna | csin | Same as csIn but asynchronous from application stand point |
| csRd | csrd | Retrieves a matching tuple from CNS |
| csRda | csrd | Same as csRd but asynchronous from application stand point |
| csCancel | cscancel | Cancels a previous csIna and csRda |
| csRemove | csremove | Removes a matching tuple from CNS |
| csMove | software implementation | Moves a matching tuple from one CNS to another |
| csTest | software implementation | Tests the completion of an asynchronous operation. |
| csEval | software implementation | Creates a new pure function upon completion creates a tuple |
| - | cslock/csunlock | Hardware commands to support software implementation of csMove |

FIG. 14

SCATTER GATHER USING KEY-VALUE STORE

STATEMENT REGARDING FEDERALLY SPONSORED RESEARCH OR DEVELOPMENT

This invention was made with Government support under Contract No.: B621073 awarded by Department of Energy. The Government has certain rights in this invention.

BACKGROUND

This invention relates generally to the scatter gather process and, more specifically, relates to scatter gather using a key-value store.

Memory is typically thought of as using blocks, where each element in a block is adjacent to another element. If the data you want is stored in this manner, then typical memory is easy to use. If, however, the data you want is stored in many different locations (such as the blocks) scattered over the memory, then this data must be gathered before use, and then the results after use scattered back to their original locations. This technique is called "scatter/gather" or (as also used herein) "scatter gather". For more detail about scatter gather, see Bryon Moyer, "How Does Scatter/Gather Work?", Electronic Engineering, Feb. 9, 2017.

Scatter/gather is a useful feature that is used widely in many scientific applications. Scatter gather typically must be performed in a single process. If multiple processes are involved, especially if the processes do not exist concurrently, this is challenging. One current approach to address this is to store the gathered data in files. This adds a layer of complexity, however, as one has to have and use a file system, organize the data within the files, and then have somewhere in the file to store results of operations on the gathered data for subsequent scattering.

SUMMARY

This section is meant to be exemplary and not meant to be limiting.

In an exemplary embodiment, a method includes performing one or more scatter gather operations by accessing a shared memory that is shared amongst multiple nodes interconnected through one or more networks. The shared memory comprises a coordination namespace that is shared amongst the multiple nodes The operations comprise: gathering data from multiple processes at corresponding multiple nodes into a one or more locations in the coordination namespace, and creating one or more tuples having a same tuple name in the coordination namespace, wherein the one or more tuples have information referencing the gathered data in the one or more locations; or scattering data that has been gathered using the same tuple name to multiple processes participating in the coordination namespace, the scattering using the one or more tuples in the coordination namespace, the scattering performed from the one or more locations into other locations at one or multiple nodes for one or multiple processes at the corresponding one or multiple nodes; or performing both the gathering data and the scattering data.

In another exemplary embodiment, an apparatus is disclosed. The apparatus comprises one or more memories having computer-readable code thereon and one or more processors. The one or more processors, in response to retrieval and execution of the computer-readable code, cause the apparatus to perform operations comprising: performing one or more scatter gather operations by accessing a shared memory that is shared amongst multiple nodes interconnected through one or more networks, the shared memory comprising a coordination namespace that is shared amongst the multiple nodes, the operations comprising: gathering data from multiple processes at corresponding multiple nodes into a one or more locations in the coordination namespace, and creating one or more tuples having a same tuple name in the coordination namespace, wherein the one or more tuples have information referencing the gathered data in the one or more locations; or scattering data that has been gathered using the same tuple name to multiple processes participating in the coordination namespace, the scattering using the one or more tuples in the coordination namespace, the scattering performed from the one or more locations into other locations at one or multiple nodes for one or multiple processes at the corresponding one or multiple nodes; or performing both the gathering data and the scattering data.

Another example is a computer program product. The computer program product comprises a computer readable storage medium having program instructions embodied therewith. The program instructions are executable by a device to cause the device to perform at least the following: performing one or more scatter gather operations by accessing a shared memory that is shared amongst multiple nodes interconnected through one or more networks, the shared memory comprising a coordination namespace that is shared amongst the multiple nodes, the operations comprising: gathering data from multiple processes at corresponding multiple nodes into a one or more locations in the coordination namespace, and creating one or more tuples having a same tuple name in the coordination namespace, wherein the one or more tuples have information referencing the gathered data in the one or more locations; or scattering data that has been gathered using the same tuple name to multiple processes participating in the coordination namespace, the scattering using the one or more tuples in the coordination namespace, the scattering performed from the one or more locations into other locations at one or multiple nodes for one or multiple processes at the corresponding one or multiple nodes; or performing both the gathering data and the scattering data.

BRIEF DESCRIPTION OF THE SEVERAL VIEWS OF THE DRAWINGS

FIG. 3A shows a flowchart depicting steps taken to send a request to a coordination namespace server in accordance with an exemplary embodiment;

FIG. 3B is an illustration of a distributed coordination namespace in accordance with an exemplary embodiment;

FIG. 14 is a table illustrating possible exemplary commands between CNS controllers in accordance with an exemplary embodiment;

DETAILED DESCRIPTION

Figure 1:
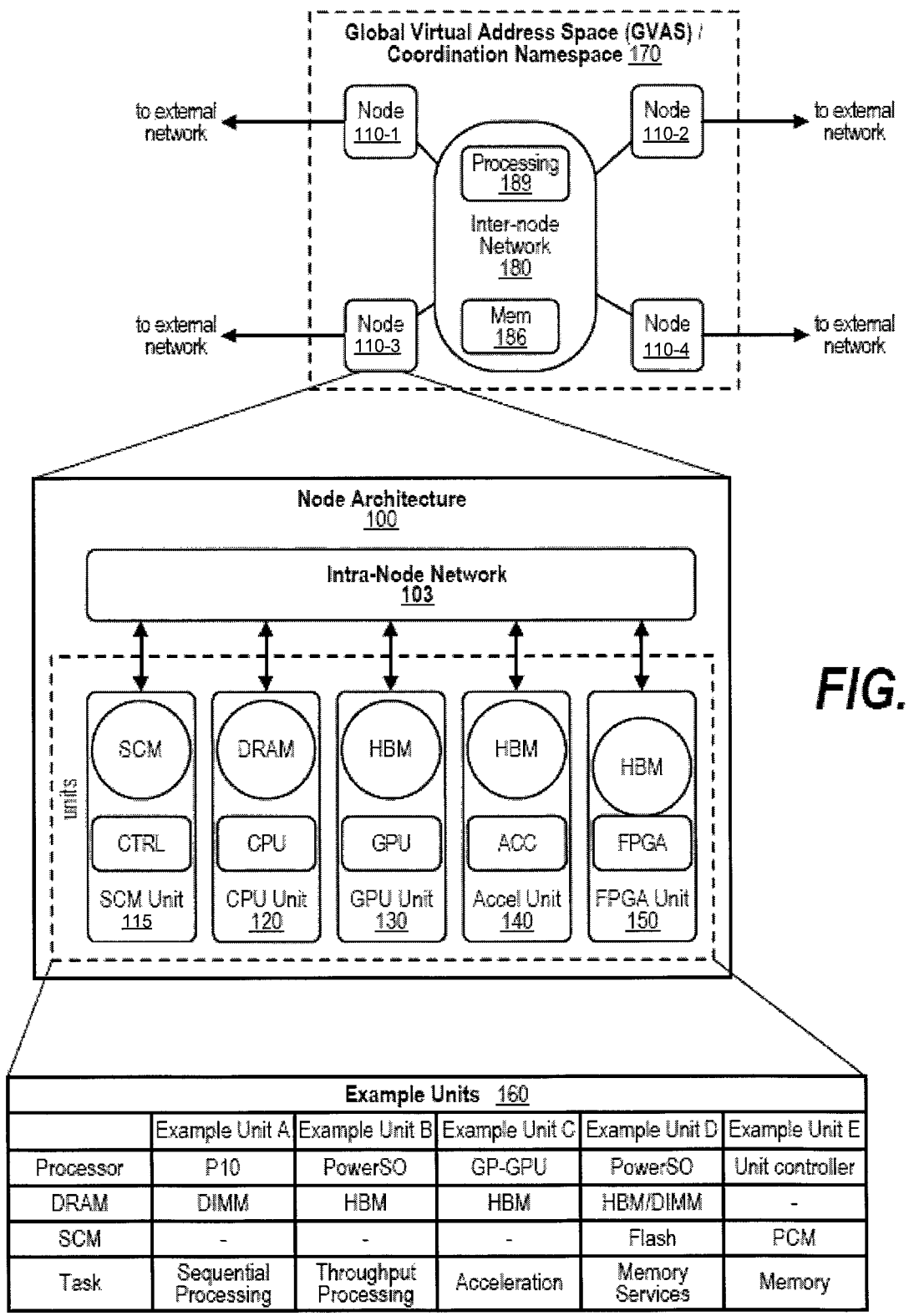
FIG. 1 shows a diagram depicting an extended memory system overview in accordance with an exemplary embodiment.
Figure 13:
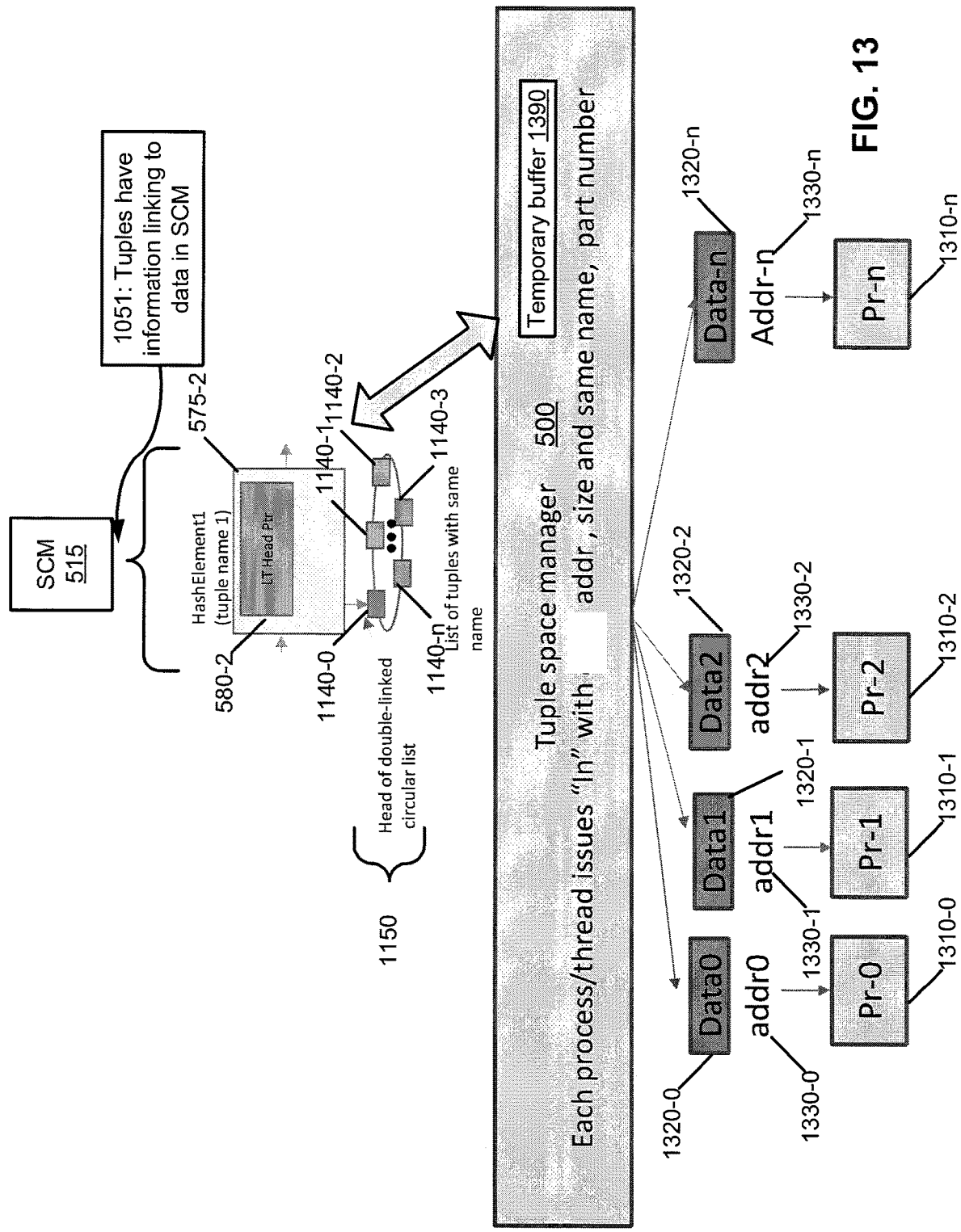
FIG. 13 is an illustration of tuple space manager interactions for the method in FIG. 12.

The following abbreviations that may be found in the specification and/or the drawing figures are defined as follows:

addr address
AGEM Aggregated Global Extended Memory
API Application Programming Interface
cmd command
CNS Coordination Namespace
CPU Central Processing Unit
CS Coordination space as used within tuple records
dest destination
DMA or dma Direct Memory Access or Accessing
DDR Double Data Rate
DRAM Dynamic Random Access Memory
EM Extended Memory
FPGA Field Programmable Gate Array
GPU Graphics Processing Unit
GVAS Global Virtual Address Space
HBM High-Bandwidth Memory
ID or id identification or identifier
I/O input/output
LT local tuple
NDE Named Data Element
NH Natural Home
NIC Network Interface Controller
OS operating system
PCI peripheral component interconnect
PHB PCI-Host Bridge
PR Pending Record, or Process (Pr) such as in FIG. 13
ptr pointer
RT remote tuple
SCM or scm Storage Class Memory
src source
RDMA or rdma Remote Direct Memory Access The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Typical scatter gather operations are performed based on address and size. Each operation would require both source and destination addresses, such as a source (src) list and destination (dest) address (for gather) or src address and dest list (for scatter). By contrast, we propose to perform these operations based on name (e.g., and size) using an implementation of tuple space. The examples herein may use a source list and destination tuple name for gather while scatter may use a destination list and tuple name. Tuple space stores tuples based on names and their location is stored in a key-value store such as a hash map. This is described in more detail below.

To perform gather operations, one may assign all the data that needs to be gathered to the same "tuple name". The scatter/gather engine, referred to as a tuple space manager herein, is given a list of locations in local memory and size along with a tuple name. The tuple space manager collects these data and transfers them to another storage area and records the information in a key-value store under the same tuple name. The user can then scatter the collected data by sending another list of destination locations in local memory along with the tuple name. The tuple space manager searches its key-value store and finds the location in storage where the tuples are stored and starts transferring them using direct memory addressing (DMA) to the local memory.

Potential use cases include one or more of the following as examples:

1) Sorting an array of data in a different order—gather them and scatter in the specified order.

2) Gathering results from multiple processes and scattering the results to a next set of participating processes.

3) Gathering data from a matrix column-wise (populate gather list with column indices) and scatter results row-wise.

4) Gathering by type (size or field), scattering by type. In this case, the tuples will be stored in a same hash index, but different hash elements per type.

Turning to FIG. 1, this figure depicts a schematic diagram illustrative of a system constructed using a node architecture 100. At the conceptual level, this architecture 100 enables constructing a system from "units" that combine memory pools and processing capability. As shown in the FIG. 1, multiple types of units are possible. Anode 110 may contain a single unit or multiple units, and four nodes 110-1, 110-2, 110-3, and 110-4 are illustrated. Examples of units in a node may include a memory service unit (single chip module, SCM, Unit) 115, a Sequential Processing unit (DRAM+CPU) 120, a Throughput Processing unit (HBM+Graphic Processing Unit (GPU)) 130, an acceleration unit 140, or a Field field-programmable gate array (FPGA) unit 150 Unlike previous architectures where GPUs and accelerators are dependent on the host processor, units are independent and treated as peers under the architecture. These units may be optimized for specific computational and memory tasks. The architecture depicts a collection of units where intra-node network 103 provides an efficient coherent interconnect between the units within a single node and inter-node network 180 interconnecting the nodes 110 within the system. Similar to a unit, the inter-node network 180 may also contain memory (Mem) 186 and associated processing 189. The external network identifies access beyond the system.

In some embodiments, a system is constructed from nodes 110 connected using an inter-node network 180. Logically, the inter-node network is an extension of the intra-node network 103. The networks differ in latency, bandwidth, and other physical characteristics. The latency optimized intra-node network allows for coherent load/store access between units. The inter-node network has characteristics that enable scaling to an exascale system while also enabling non-coherent load/store accesses between nodes.

The system includes an Extended Memory (EM) architecture for accessing memory beyond a node 110. The Extended Memory (EM) architecture includes two methods for accessing memory: the Global Virtual Address Space (GVAS) and the Coordination Namespace (CNS) methods 170 distributed over the full system. In this document, the CNS methods are used. Nodes 110 within the system may have one or more of four major characteristics: (1) Capable of being managed by a single operating system; (2) Efficient coherent load/store access to all memory pools within the node; (3) Global Virtual Address Space for referencing memory pools inside and outside the node; and (4) Access to a system ide Coordination Namespace. In this document the CNS is used.

In prior systems, each node 110 typically has a fixed topology and limited number of configurations. For example, a node may have two (2) general-purpose processors, 256 GB of DRAM, zero (0) to six (6) Graphical Processing Units (GPUs), and one (1) or two (2) network devices. When constructing large systems, this fixed topology may cause an imbalance in resources. For example, if the targeted application requires a GPU to CPU ratio of 12 to 1, the system would end up with 50% of the general-purpose processors not being used. If the ratio was equal to or lower than 6 to 1, a heterogeneous combination of nodes (some with fewer than 6 GPUs) could meet the ratio, but the node would be over designed and GPU resources are not used. For optimal flexibility in large system design, there needs to be a set of units individually connected to a network and the means for dynamically configuring these units into a node. Therefore, there is a need to dynamically create a logical grouping of units to perform the functions of the targeted application.

The Extended Memory architecture views the system as a collection of memory pools with attached processing rather than a collection of computational engines and associated memory. The subtle reordering places focus on memory allowing programmers to define the data organization, layout, and distribution across the various memory pools in the system. The approaches described herein simplify managing the multiple memory pools and the extended memory architecture provides a consistent view of memory across all units in the system or a subset of units in the system. From a conceptual point-of-view, the plurality of nodes 110, may be viewed as a single flat network connecting all units together as peers with equal access to all memory pools and compute resources in a consistent manner. The independent nature of the units enables constructing a system with the proper balance of Sequential Processing units and Throughput Processing units at the system level to meet the needs of a variety of applications and workflows. The approach is to present each memory pool and associated computational capability as independent units to software. The units may be, for example, a combination of processors, programmable logic, controllers, or memory. Example Units 160 contains a list of example units and does not imply any specific limitations on the types of units within a system with many other types possible, the units and devices are, but not limited to, general-purpose processors, special purpose processors, programmable logic devices, controllers, memory, and the like. To dynamically configure a logical group, these units need to appear to software, especially the operating system and device drivers, as if these are all part of a physically connected system within the shared memory space.

This is like how the cores and GPUs of a traditional node are assigned by the OS, but at a system wide level. The extended memory architecture extends the shared memory space (a Global Virtual Address Space) to other nodes 110 and provides an efficient means for storing data, communications, and coordination within applications and workflows through a separate, system-wide Coordination Namespace. Units are the fundamental building blocks for a system. In an embodiment, these units may run a specialized kernel for local management in addition to an operating system. This structure allows for combining both traditional and specialized units in various ratios to create a system tailored to the needs of a specific application or workflow. The intra-node network connects units within a node while an inter-node network connects a plurality of nodes to create an exascale system. The intra-node network is optimized for coherently connecting units which are physically close. The inter-node network may be a network such as, but not limited to, Ethernet or InfiniBand with optimizations for enabling a Global Virtual Address Space across the connected nodes. As depicted in FIG. 1, the node architecture may include external network connections providing access outside of the system. These external network connections are networks, such as, but not limited to, Ethernet or InfiniBand attached to each node. One or more units within each node act as a bridge from the intra-node network to the industry standard networks.

From a physical point of view, the term memory traditionally refers to the DRAM or other memory associated with a single system. Thus, an operating system in such a system associates real addresses with DRAM locations. A virtual address translation mechanism converts virtual addresses in a user application to these real addresses. During application execution, the operating system may relocate the physical contents pointed to by a virtual address to some other medium like non-volatile memory or disk. In this case, the application's operation stalls when accessing the associated virtual address until the physical contents are moved back into DRAM and address translation is re-established by the operating system. The extended memory architecture extends this concept of memory in two directions. First, the term memory refers both to DRAM and to SCM associated with the node and to DRAM and SCM on remote nodes. This provides the operating system with a larger range of physical memory to which a virtual address can be associated.

It is helpful at this point to provide a brief overview of memory. SCM stands for "storage class memory", which really is a broad class of storage devices like flash-memory-based non-volatile memory, phase change memory, and the like. They provide larger storage capacity, similar to SSD (solid state drive) hard drives on the order of terabytes per node when DRAM typically is on the order of 100's of gigabytes per node. DRAM also is volatile memory, that is, data is lost when power is lost or the system is rebooted. The latency of storage class memory is higher than DRAM. Hence, the references herein to DRAM being used as a local memory with lower latency. In exemplary embodiments herein, both system memory and storage class memory are used for CNS. System memory is typically DRAM/HBM that is easily accessible by the processor through its built in memory controller. The storage class memory can be, e.g., a PCI-attached card and has an onboard SCM controller that the processor talks to in order to retrieve data. In exemplary embodiments herein (as described in more detail below), the hash table structures for CNS may be stored in the system memory portion while the tuple data themselves may be stored in the SCM, as an example.

The second extension is a complementary method, provided to the programmer, to facilitate access to Named Data Elements (NDEs) anywhere in the system, at any time. In contrast to the byte-level virtual address used to reference data, these NDEs exist in a new namespace and are referenced by a name or a combination of name and datum within the NDE's contents. The combination of these two techniques provides new and innovative mechanisms for accessing memory within a node as well as across nodes. In addition, the Coordination Namespace allows for accessing address spaces corresponding to different applications within a workflow independent of time.

In an example embodiment, two memory models provided by the extended memory architecture are a Global Virtual Address Space and a Coordination Namespace. As previously stated, the Coordination Namespace is the model used in the examples herein. The Coordination Namespace model, hereafter referred to as the Coordination Namespace or CNS, provides an alternate view of extended memory that is separate from a processes' virtual address space. In the Coordination Namespace, references to extended memory use a "name" for accessing a finite, ordered list of immutable values referred to as a Named Data Element (NDE). In an exemplary embodiment, the first field associated with every NDE is its name, a character string with an implementation-dependent maximum length. The "name" references an NDE located in the Coordination Namespace. The "name" can simply be the first field, the name, a search template for any set of the fields in the NDE, and the like and may be referenced herein as a "name," a "key," or as a "NDE-name." The Coordination Namespace allows access to NDEs contained within a distributed object store.

While it is possible for both these memory models to concurrently exist in a system, a given physical memory location is only accessible using one of the models. The NDE access method provides a set of commands to create, read, retrieve, and destroy NDEs in the Coordination Namespace.

The set of commands described herein are for illustrative purposes only where changes, variations, new, and differences are expected in various embodiments of the concepts described herein. In an embodiment, each node contains a CNS controller that provides access to the Coordination Namespace. When accessing the Coordination Namespace, the CNS controller [e.g., Client or Server] may perform a distributed hash function on the NDE-name to locate the data and perform the data movement. The CNS Server allows access to NDEs in a distributed system in a similar way as load-store instructions in a typical instruction set allows access to locations in a virtual address space. Furthermore, these NDEs are located beyond an application's virtual address space. NDEs may persist beyond the tenure of the application.

Figure 2:
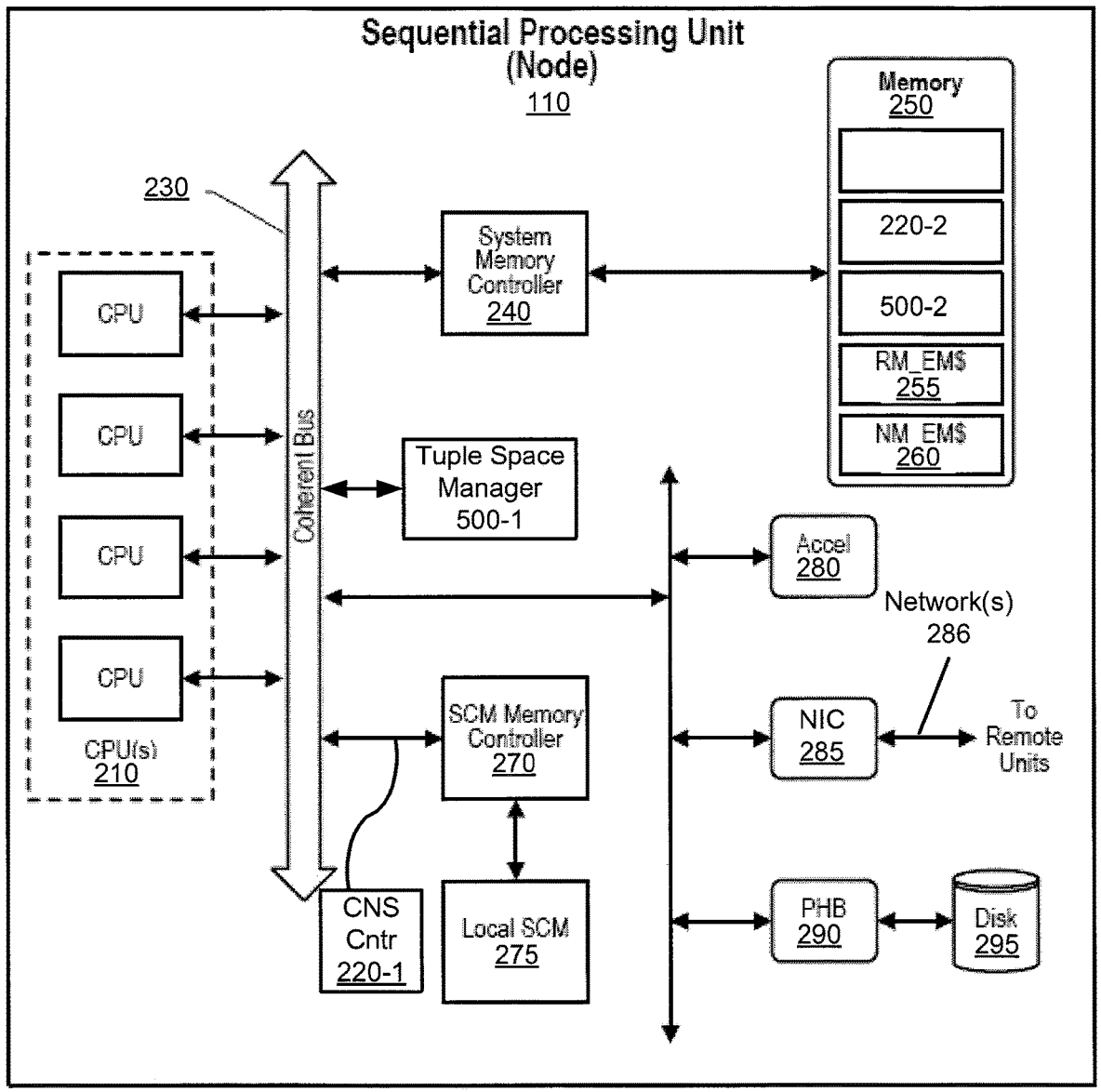
FIG. 2 shows a diagram depicting exemplary components of a sequential processing unit referred to as a node in accordance with an exemplary embodiment.

FIG. 2 depicts an example embodiment of a Sequential Processing unit (SPU) referred to as a node 110 supporting caching remote memories within a local system's storage. The local system has one or more central processing units (CPUs) 210 accessing memory 250 via a coherent bus 230. A PCI-Host Bridge (PHB) 290 connects to a Disk 295 which may be used for paging or for other purposes, such as, loading programs. By way of example, and not limitation, other architectures may be used to perform I/O, such as, the Industry Standard Architecture (ISA) bus, the Micro Channel Architecture (MCA) bus, and the Peripheral Component Interface (PCI). System memory controller 240 enables regions of local memory 250 to be used as a cache. The local memory may be, for example, DRAM, HBM, or the like, and function as both system memory and a cache for remote memory or locally attached SCM 275 (more distant than the local memory 250). A large physical address window (equal to or larger than the memory regions allocated for the cache) may be used for mapping remote and local SCM. Smaller blocks of the physical address space are then mapped, using a cache directory, to a smaller physical memory area allocated to the extended memory caches (RM_EM$ or NM_EM$). In an embodiment, the system memory controller 240 may support multiple independent cache regions dedicated to caching a memory. For example, the "near-memory" cache (NM_EM$) 260 serves for data stored in the locally attached SCM 275 and the "Remote-memory" cache (RM_EM$) 255 is used for data located in remote memories attached to a remote node. In addition, there can be a plurality of each type of cache. When a referenced datum is not available in the NM_EM$, the reference is forwarded directly to the associated "near-memory" SCM Memory Controller 270, completing the access without any CPU involvement. When a referenced datum is not available in the RM_EM$, the memory controller sends an Extended Memory (EM) Cache Miss exception to one of the CPU(s) 210. A selected CPU may utilize an interrupt vector for handling the EM Cache Miss exception. In an embodiment, a firmware interrupt handler forwards the virtual address causing the exception to an architected network interface to bring a replica of the remote memory into the RM_EM$. When data is returned from the network interface controller (NIC) 285 and written into the RM_EM$ 255, the exception handler is notified, and the CPU load operation is re-issued and is serviced from the RM_EM$. The exception is used to: 1) Prevent stalling the CPU load for the entire duration of the network operation. 2) Determine the virtual address associated with the miss. The network controller may be configured to allow the firmware exception handler to fetch remote memory without needing a full-fledged device driver. In an embodiment, an architected, low latency interface for performing remote direct memory accesses (RDMA) is configured to route the RDMA request to the correct unit or node based on a virtual address. RDMA is a standard protocol to move data from remote nodes.

The schematic diagram of the node 110 is shown in FIG. 2 may implement the methods disclosed herein. The node is only one example of a suitable system node and is not intended to suggest any limitation as to the scope of use or functionality of embodiments described herein. The node could be constructed from a single CPU, a single coherent bus, a single system memory controlling accessing a single memory unit, that is, a node consisting of a single Unit. Examples of well-known computing systems, environments, and/or configurations that may be suitable for use with the node include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. The CPUs 210 may be described in the general context of computer system-executable instructions, such as program modules, being executed by a computer system. Generally, program modules may include routines, programs, objects, components, abstract data types, data structures, and so on that perform tasks or logic. The CPUs 210 may be practiced in distributed cloud computing environments where tasks are performed by remote processing devices that are linked through a communications network 286 via the NIC 285. In a distributed cloud computing environment, program modules may be in both local and remote computer system storage media including memory storage devices.

The node 110 may also contain other devices such as, but not limited to, accelerators 280, NICs 285, and SCM Controllers 270 connected to the CPUs 210. By way of example, and not limitation, these devices can be directly connected to the coherent bus 230 or through interface architectures such as Open Coherent Accelerator Process Interconnect (OpenCAPI), or Peripheral Component Interconnects Express (PCIe) bus.

The node 110 uses CNS, e.g., to access data stored in the local SCM 275. As such, the node 110 contains a CNS controller (Cntr) 220, which may be implemented as hardware (CNS controller 220-1) located intermediate the coherent bus 230 and the SCM memory controller 270, may be integrated as hardware into the SCM memory controller 270, or be located as hardware in another location in node 110. The CNS controller 220 may alternatively or additionally be implemented as computer readable code as CNS controller 220-2 in memory 250 and retrieved and executed by the one or more CPUs 210 to cause the node 110 to perform actions as described herein. The accessing of data via the CNS is described in more detail below.

The tuple space manager 500 may be implemented in hardware as tuple space manager 500-1. The tuple space manager 500 may also be implemented as alternatively or additionally as computer readable code as tuple space manager 500-2 in memory 250 and retrieved and executed by the one or more CPUs 210 to cause the node 110 to perform actions as described herein. The tuple space manager 500 is described in more detail, beginning at FIG. 5.

The coherent bus 230 represents one or more of any of several types of bus structures, including a memory bus or memory controller, a peripheral bus, an accelerated graphics port, and a processor or local bus using any of a variety of bus architectures.

The node 110 typically includes a variety of computer system readable media, such as disk 295. Such media may be any available media that is accessible by the node, and it includes both volatile and non-volatile media, removable and non-removable media. The memory 250 may be any system memory that can include computer system readable media in the form of volatile memory, such as, DRAM and/or a cache memory. The node may further include other removable/non-removable, volatile/non-volatile computer system storage media. By way of example only, a storage system can be provided for reading from and writing to a non-removable, non-volatile magnetic media (not shown and typically called a "hard drive"). Although not shown, a magnetic disk drive for reading from and writing to a removable, non-volatile magnetic disk or memory stick, and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, the local SCM 275 may include at least one program product having a set (e.g. at least one) of program modules that are configured to carry out the functions of embodiments of the methods disclosed herein. A program/utility, having the set (at least one) of program modules, may be stored in the SCM by way of example, and not limitation, as well as an operating system, one or more application programs, other program modules, and program data.

Each of the operating systems may have one or more application programs, other program modules, and program data or some combination thereof, and may include an implementation of a networking environment. The program modules generally carry out the functions and/or methodologies of embodiments of the methods as described herein. The node may also communicate with a set of one or more external devices such as a keyboard, a pointing device, a display, a tablet, a digital pen, etc. wherein these one or more devices enable a user to interact with the node and/or any devices (e.g. network card, modem, etc.) that enable the node to communicate with one or more other computing devices. Such communication can occur via Input/Output (I/O) interfaces. These include wireless devices and other devices that may be connected to the node, such as, a universal serial bus (USB) port, which may be used by a tablet device (not shown). Still yet, the node can communicate with one or more networks such as a local area network (LAN), a general wide area network (WAN), and/or a public network (e.g. the Internet) via a network adapter. As depicted, a network 285 communicates with the other components of the node via the coherent bus 230.

The instant techniques use a Coordination Namespace (CNS). This is described in more detail now. Referring to FIG. 3A, this figure shows a flowchart depicting steps taken to send a request to a coordination namespace (CNS) server. At step 300 an incoming request, such as an out (NDE-name, NDE-value, or key-value) for a named data element (NDE), is received. At step 310, a hash calculation is performed on the NDE-name (hashing may result in a node identifier, a table identifier and a hash index for the node). The hash is performed on at least a portion of the NDE-name parameter passed to the NDE request. Using the node identifier, at step 320, the incoming request is sent to a node 110 (e.g., and the CNS controller 220 therein) identified by hash result and the process ends at step 395.

FIG. 3A makes the process of finding data in a CNS relatively simple, and to an extent, it is. However, there are also multiple details and background information that is helpful to review at his point. The coordination namespace (CNS) model provides an alternative view of memory distributed across the system that is separate from the virtual address space of a process. Memory within a CNS is treated as key-value pairs instead of being byte addressable. That is, the CNS is a form of a key-value pair that can also span all or a subset of units within the system. The CNS allows applications to store a variable amount of information in distributed memory and to retrieve this information using a single "name". The name is a text string associated with the information. The "name" and associated information is referred to as a tuple. More specifically, memory within the CNS is referenced using the "name". The "name" (also referred to as a "key") references a variable sized block of data (e.g., a value) stored within the tiers of memory distributed across the system. The key-value pair (and therefore the name and associated information as a pair) is referred to as a tuple.

FIG. 1 shows that multiple different nodes 110 may be accessed via an intra-node network 103. FIG. 2 illustrates a node having a local CNS controller 285 and network interface controller (NIC) that may be used to access a distributed memory with CNS. As mentioned above, the memory associated with a given CNS may be distributed across the memory pools within the system. The local CNS controllers 220 are responsible for managing the contributed memory and working with other remote CNS controllers 220 for performing CNS accesses on behalf of the local processes. An AGEM compliant system should have a local CNS controller 220 associated with each node 110.

All access to a CNS requires calling Application Programming Interface (API) routines. To create a tuple, an application calls an API routine and supplies the name and data, or virtual address pointer to the data, as parameters. The API routine sends an instruction to a local CNS controller 220 to create the tuple of the given name. The local CNS controller determines where the tuple should be created and, in cooperation with other remote CNS controllers, copies the data from the processes address space into the CNS memory. Once the data is copied, a record of the tuple is generated. Once a record of the tuple is created, the applications can retrieve the information associated with the tuple by again calling an API routine with the name of the tuple and a virtual address pointer where to place the data. The API sends an instruction to a local CNS controller 220 which, in cooperation with other remote CNS controllers, locates the tuple within the CNS and copies or moves the associated information into the calling process's virtual address space.

FIG. 3B is an illustration of a distributed coordination namespace and includes a pictorial view of the distributed CNS. As shown in FIG. 3B, the CNS 330 is divided into groups 340-1 through 340-N. Each group 340 represents the portion of the CNS storage contributed by a node 110. Any node 110 may attach to, and access a CNS 330. The unit performing a CNS access is called the agent using the API routines. When an access instruction is received by the local CNS controller 220, a hash function is applied to the name, resulting in a hash value. See block 310 of FIG. 3A. A pre-defined number of upper bits from the hash value may be used to select the group associated with the name. The selected group is called the "natural home" for the tuple. Once the natural home is determined, the local CNS controller 220 forwards (see block 320 of FIG. 3A) the request to the CNS controller 220 corresponding to the tuple's natural home (or "target") CNS controller 220. The target CNS controller uses a predefined number of lower bits from the hash value to select an entry within a local hash table 350, also called a hash bucket. Depending on the type of reference, the target CNS controller 220 either searches the linked list 360 associated with the hash bucket to determine if the referenced tuple exists, or adds an entry to the list if a new tuple is being generated.

Tuples may also be directed to a preferred group rather than being stored at the natural home. A preferred group ID is provided along with the tuple creation request. The tuple is called a "relocated tuple" and the group where the data is located is called the "actual home". Applications can retrieve a relocated tuple by providing just the name, or name and preferred group. Providing a preferred group when retrieving a tuple causes the CNS controllers to search the hash bucket corresponding to the preferred group first. If the tuple is not found, the request is forwarded to the natural home.

Figure 4:
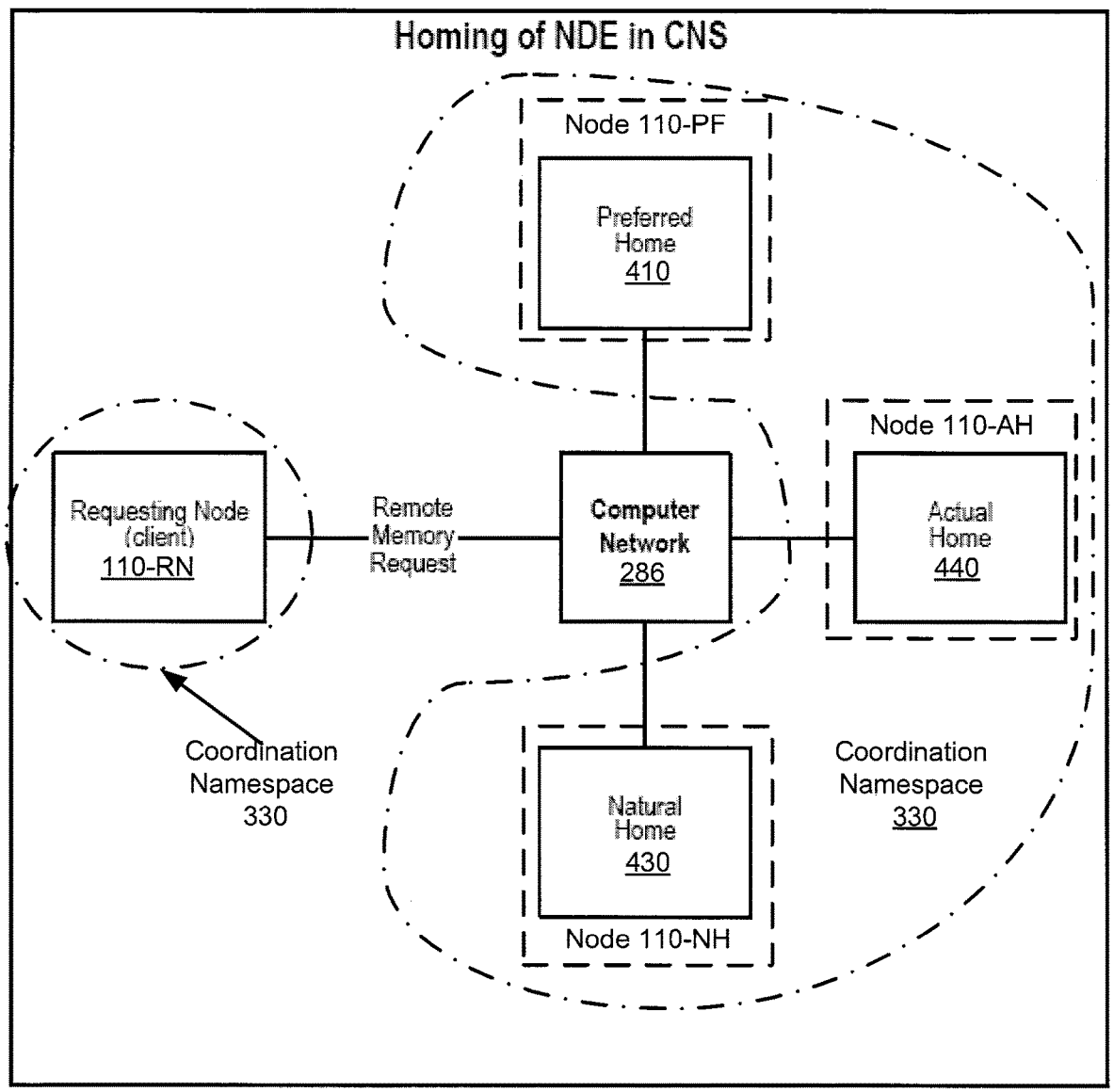
FIG. 4 shows a diagram depicting the homing of a named data element (NDE) in a Coordination Namespace (CNS) in accordance with an exemplary embodiment.

FIG. 4 also illustrates this concept. FIG. 4 shows a diagram depicting the homing of a named data element (NDE) in a Coordination Namespace (CNS) 330. The requesting node (a node 110-RN) is the location running the process making the NDE request. The hash algorithm may be applied to the NDE-name to identify the natural home 430. The natural home 430 directly or indirectly indicates the node 110-NH where the NDE is created or may be found if no other information is provided. The preferred home 410 may be provided by the process making the request or by a prediction algorithm in the CNS client 220, for example, by an affinity parameter. When supplied, the preferred home 410 directly or indirectly indicates the node 110-PH where the NDE should be created or where to first search for the NDE. The actual home 440 identifies the node 110-AH where the NDE resides.

When creating a NDE, the preferred home 410 is tried first. If the NDE cannot be created there for some reason, such as the node being out of memory, an alternate home is chosen, and that node becomes the actual home 440. When a NDE is created, the natural home 430 always keeps a record in the local hash table indicating the actual home but does not store the data. When a NDE is requested, the hash table on the preferred home 410 is searched first. If the NDE is not found, the request is sent to the natural home 430 for recording the dummy pointers for the associated key. The nodes 110-NH, -AH, and -PH identified by the natural, actual, and preferred homes, respectively, can all be different, the same, or any combination. The CNS 330 is spread over these nodes. In addition, they can also be different or the same as the requesting node 110-RN, and therefore the node 110-RN may also be part of the CNS 330. The communication between the requesting node, the natural home 430, the preferred home 410, and the actual home 440 may be performed via the computer network(s) 286.

Figure 5:
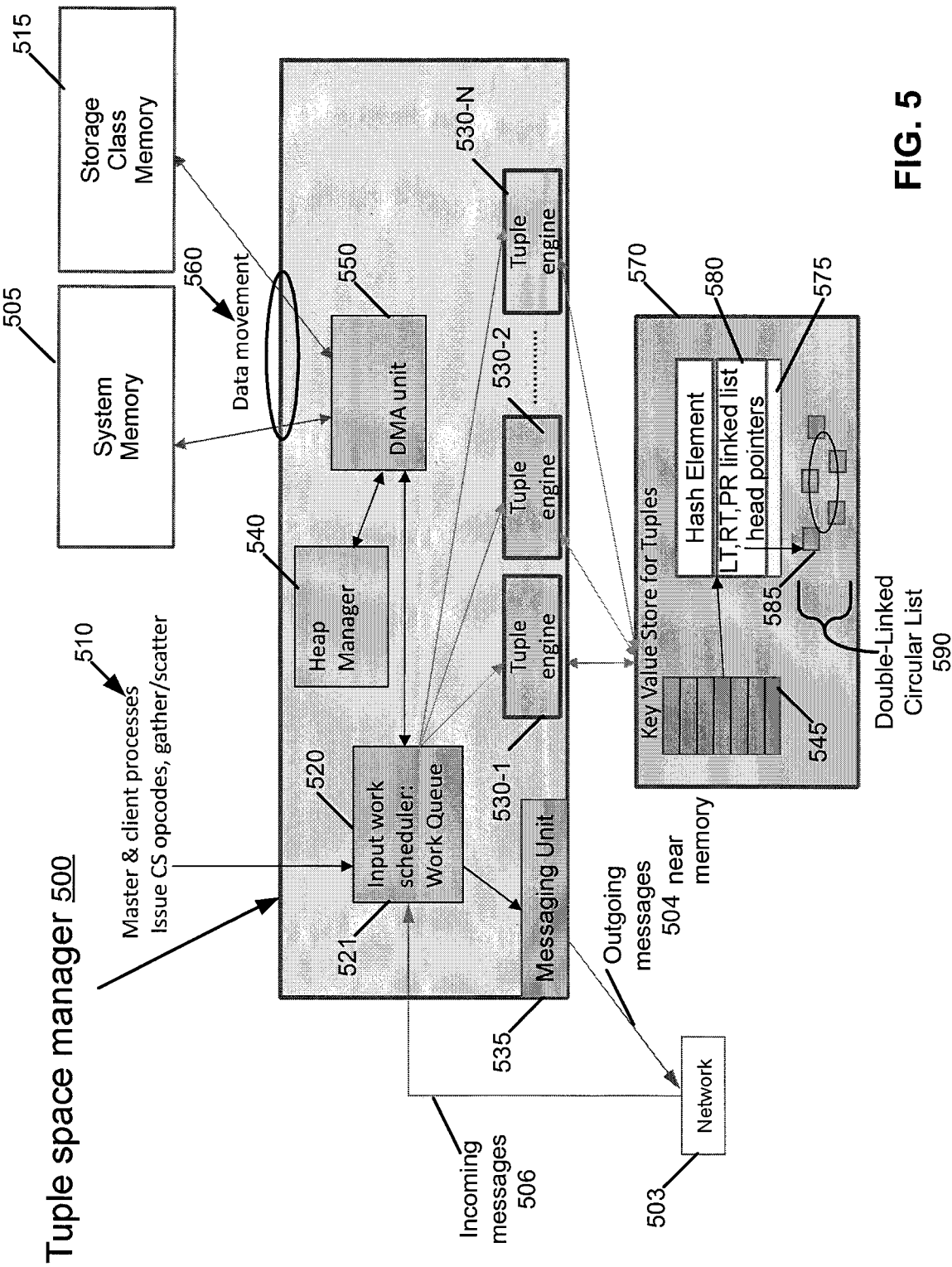
FIG. 5 is a block diagram of a tuple space manager interacting with a key-value store for tuples, in accordance with an exemplary embodiment.
Figure 15:
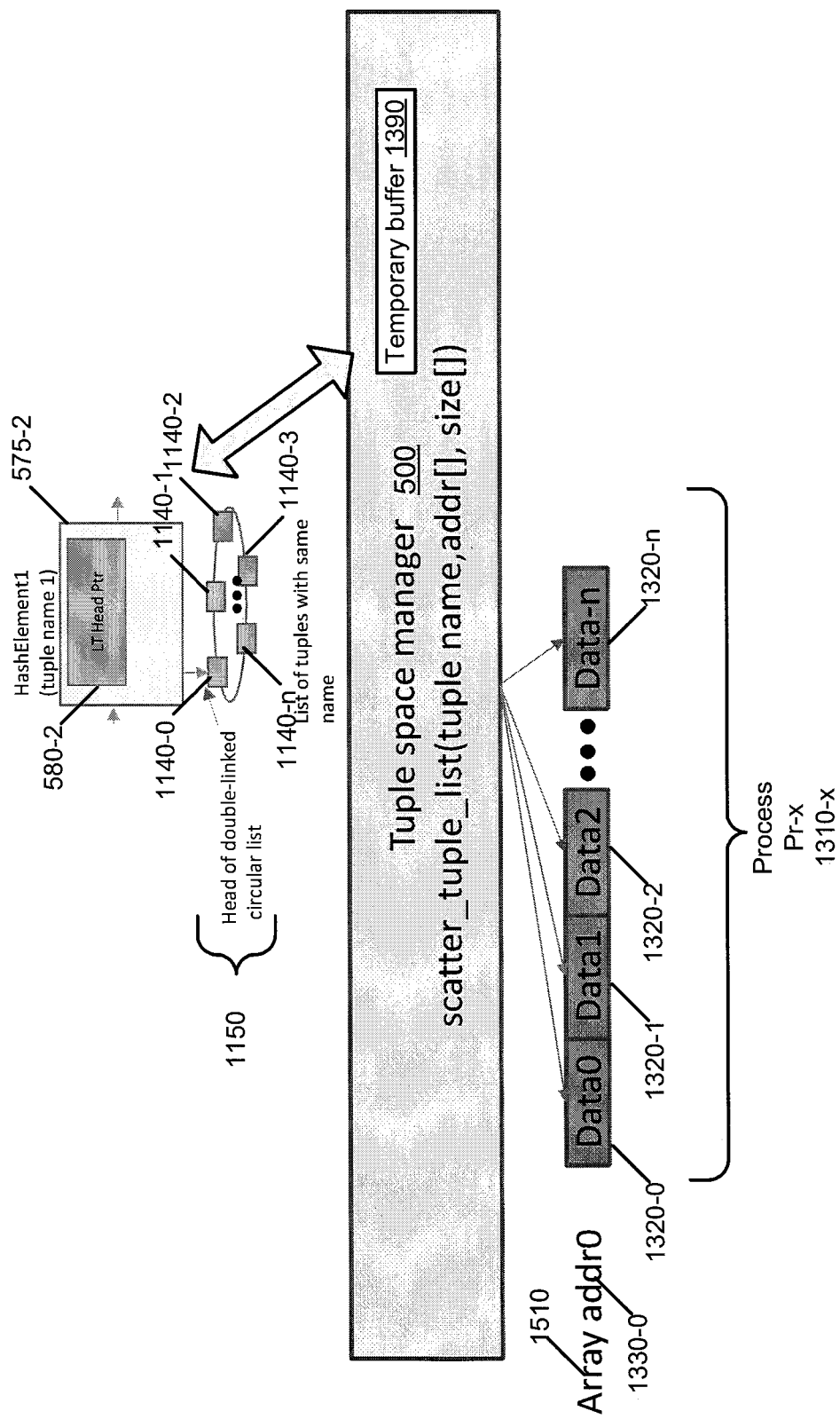
FIG. 15 illustrates a special case of scatter gather in an exemplary embodiment.

The rest of this document is laid out as follows. FIG. 5 presents an exemplary embodiment tuple space manager that is used to perform the scatter gather operations. FIGS. 6-9 describe a first approach for scatter gather operations, where a multipart tuple for scatter gather operations is stored in a single contiguous memory location. FIGS. 10-13 illustrate a second approach for scatter gather operations, where the multipart tuple for scatter gather operations is stored in multiple memory locations. FIG. 14 is an example of possible software API functions that can be implemented and used in an exemplary embodiment. FIG. 15 illustrates a special case for scatter gather operations. FIGS. 16-20 illustrate examples of implementations of a key-value store for tuples, in accordance with exemplary embodiments.

FIG. 5 is a block diagram of a tuple space manager interacting with a key-value store for tuples, in accordance with an exemplary embodiment. The tuple space manager 500 comprises an input work scheduler 520 with a work queue 521, N tuple engines 530-1, 530-2, . . . , 530-N, a heap manager 540, a messaging unit 535, and a DMA unit 550. The tuple space manager 500 is coupled in this example to a system memory 505 and a storage class memory (SCM) 515, e.g., in a node 110. The tuple space manager 500 is distributed, meaning each node 110 has its own copy of or access to a "local" tuple space manager 500. However, exemplary embodiments allow nodes to not have storage class memory 515 and yet participate in CNS over the network 503. The master and client processes (such as threads) issue CS opcodes as gather/scatter commands in reference 510. CS and CNS are being used interchangeably. Typically, CNS is used to refer to the whole architecture of coordination namespace and CS is used for a more limited nomenclature for coordination space as used within the tuple records. These come into the work queue, and the input work scheduler 520 which ensures these commands are addressed. The work queue 521 is used by the input work scheduler 520 when scheduling work to the tuple engines 530, or when deciding to send requests off node or to DMA and the like. That is, the input work scheduler 520 issues new work to the different tuple engines 530. The heap manager 540 supports scatter/gather lists, such as allocating/deallocating multiple addresses. The heap manager 540 therefore allocates/frees memory in storage class memory 515. The DMA unit 550 provides access (via data movement 560) into or out of local memory such as system memory 505 (e.g., see memory 250 of FIG. 2) or SCM 515 (e.g., see local SCM 275 of FIG. 2). The requests sent off node, such as remote access of data, will need help from the messaging unit 535 and the network 503, e.g., employing something like an RDMA protocol via outgoing messages 504. Similarly, network messages 506 also can be incoming and be routed to the input work scheduler 520, e.g., for causing local access to the SCM 515. Incoming messages 506 would be from the network 503, where the outside tuples space feeds directly the work scheduler 521 and the incoming messages 506 are injected into the work scheduler 521 as another process like the client process from reference 510. The DMA unit 550 moves data according to the scatter/gather addresses without the involvement of software. The tuples engines 530 provide search, sort, and aggregate functions for tuples (as these functions are described below).

The key-value store 570 is described in part here but is also described in more detail in reference to FIGS. 16-20. The key-value store 570 comprises a hash element 575 that has a local tuple (LT) head pointer (ptr) 580, which points to (references) the head 585 of a double-linked circular list 590 of local tuples. Note that a hash element 575 may be considered to be what has been previously referred to as a named data element (NDE). The hash element 575 may also include remote tuple (RT) and/or pending record (PR) linked list pointers, which are described in more detail below. Depending on implementation, there may be only a single tuple (e.g., without a list 590) (see, e.g., FIG. 7) or multiple tuples in the list 590 (see, e.g., FIG. 11). The local tuples (LTs) are described in FIGS. 16-20, as are additional types of tuples (RTs and PRs) that are possibly used.

The near memory 545 can be a separate memory that has lower latency with respect to the tuple engines 530 or could be a partition within system memory 505. The storage class memory can also be another partition within system memory 505. The arrows between the input work scheduler 520 and the tuple engines 530 and between the tuple engines 530 and the key value store 570 could be implemented as ring or bus or multiplexor, as examples.

There are two approaches described herein. The first approach is to store a multipart tuple from a gather operation in a single contiguous memory location, that is a single tuple as head 585. Scatter addresses and gather addresses to the tuple space manager 500 that manages the coordination namespace. A mechanism is provided in the tuple space manager 500 to move data according to the scatter/gather addresses without the involvement of software. The list of scatter/gather addresses is accessible by the tuple space manager 500. The first approach is illustrated by FIGS. 6-9.

A second approach is to store the multipart tuple in multiple memory locations. This approach needs to maintain a linked list ("linkedlist") such as list 590 in the key-value store that provides address of these individual gathered tuple records. This approach needs a mechanism to identify this scatter/gather list within the key-value store, and needs a mechanism to identify the order between the scatter/gathered tuples in the tuple space manager.

For the first approach, methods (see FIGS. 6 and 8) are disclosed to implement gather (FIGS. 6 and 7) and scatter (FIGS. 8 and 9) of data using a tuple space controller 500. This makes use of a key-value store 570, e.g., in hardware. Explicit gathering into one contiguous block in storage class memory (scm) may be performed. Applications can create list of data in system memory. The addresses are collected in an array and given to the hardware to gather into one location in storage class memory. The tuple space controller 500 creates only one tuple record for the aggregated data in scm. Data aggregated in storage class memory can be scattered again to different addresses by passing the tuple name, list of addresses and list of size where the data needs to be scattered.

Once gathered in storage class memory, the tuple space manager 500 can post process and distribute data again into a different method/tuple name as required. The linked list storing the tuple name will be modified accordingly. Scatter/gather is performed into only one tuple record per name. Gather information is stored within the tuple and the data may be redistributed based on the previous gathered information. One possibility is to store the block size for each fragment within the tuple to facilitate this.

Figure 6:
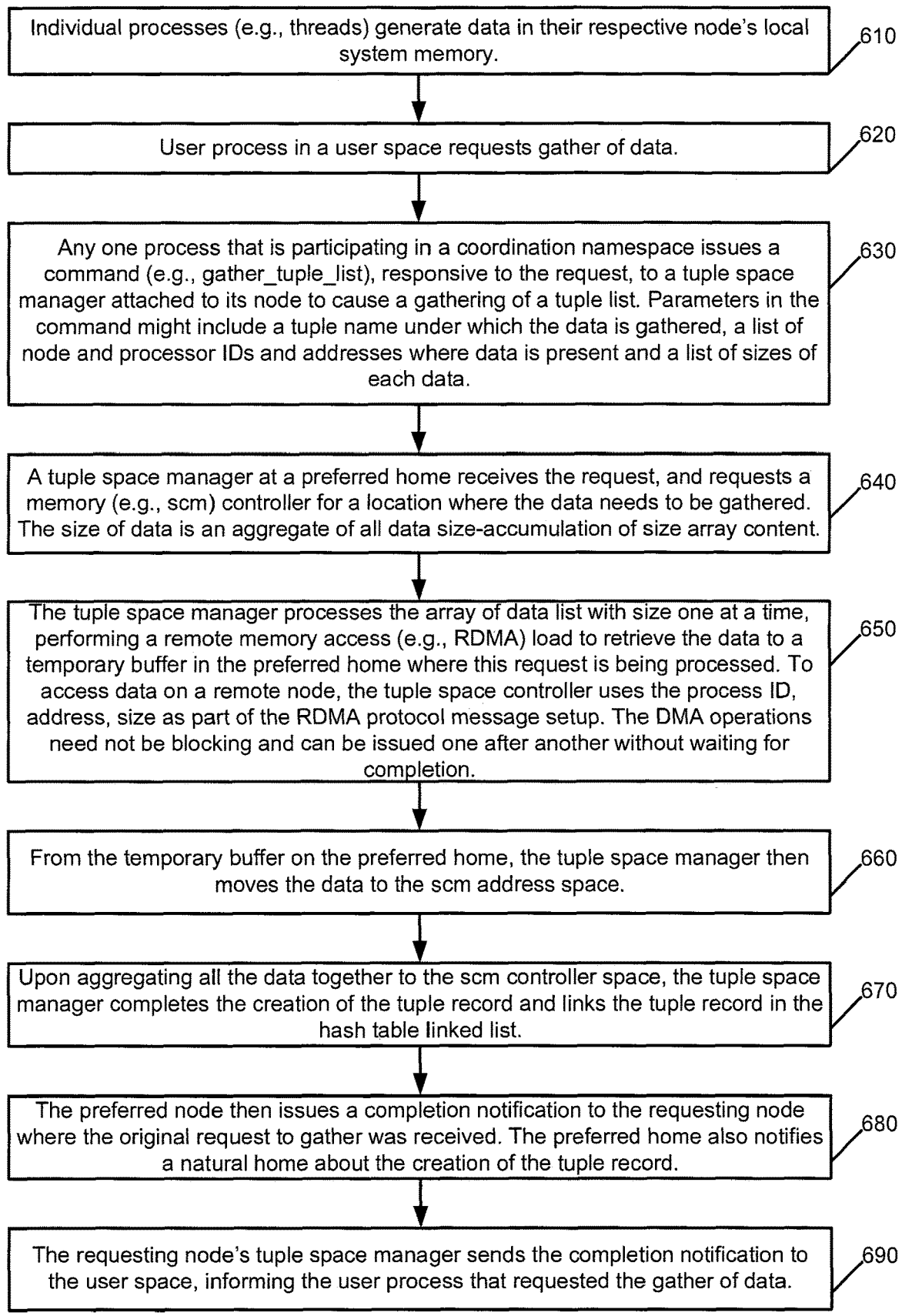
FIG. 6 is a flowchart of a method of a first approach to store a multipart tuple from a gather operation in a single contiguous memory location.
Figure 7:
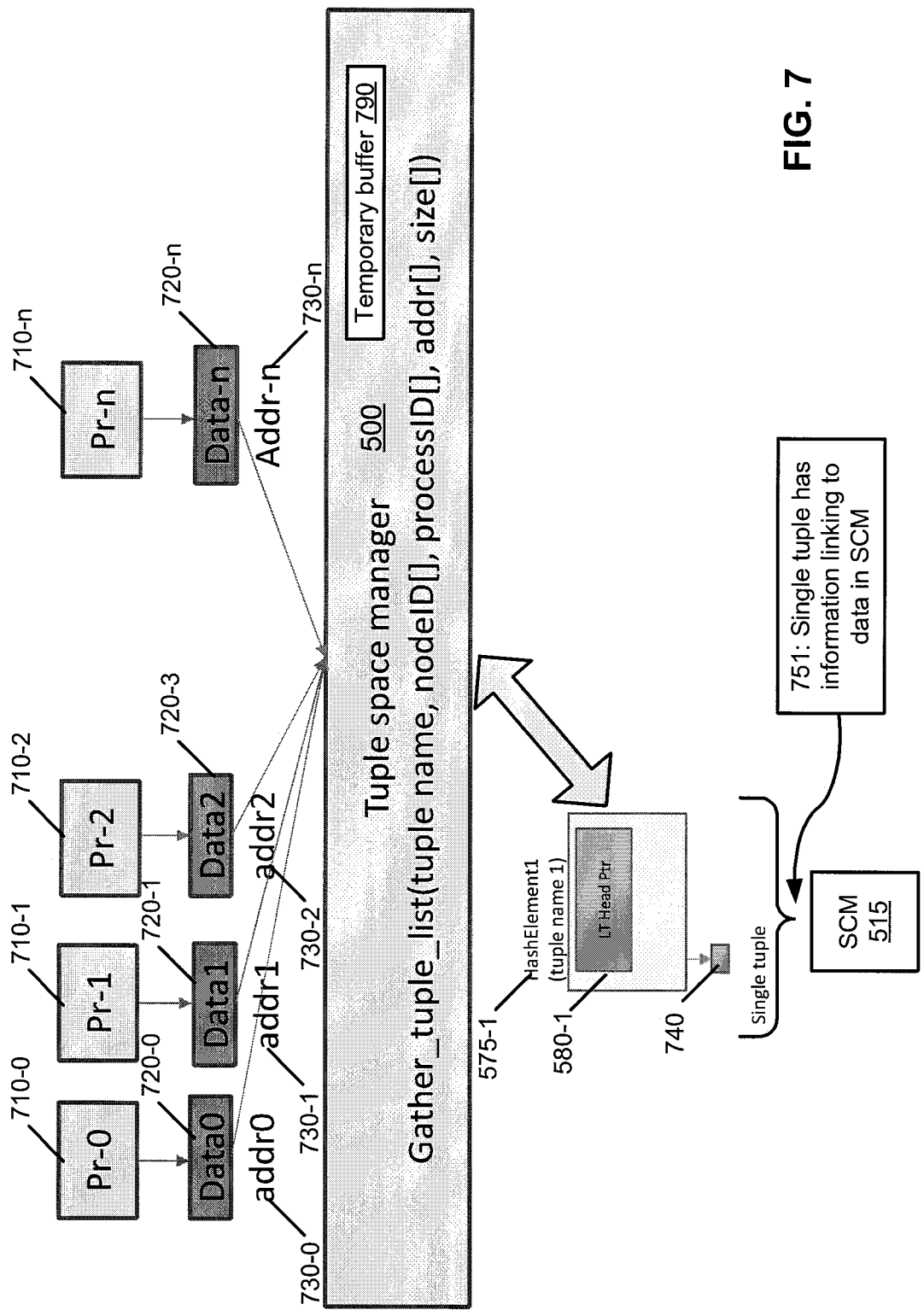
FIG. 7 is an illustration of tuple space manager interactions for the method in FIG. 6.

Referring to FIGS. 6 and 7, FIG. 6 is a flowchart of a method of a first approach to store a multipart tuple from a gather operation in a single contiguous memory location, and FIG. 7 is an illustration of tuple space manager interactions for the method in FIG. 6. In block 610, individual processes (e.g., threads) generate data in their respective node's local system memory. This is illustrated in FIG. 7 by the processes Pr-0 710-0, Pr-1 710-1, PR-2 710-2, through PR-n 710-n, which create corresponding data data0 720-0, data1 720-1, data2 720-2, through data-n 720-n. Each of these data is at a corresponding address addr0 730-0, addr1 730-1, addr2 730-2, through addr-n 730-n. These addresses are the addresses in system memory (e.g., 505 in FIG. 5) from which the tuple space manager 500 is going to gather and store into SCM (e.g., 515 in FIG. 5).

In block 620, a user process in a user space (e.g., connected to or part of a node 110) requests gather of data. In block 630, any one process that is participating in a coordination namespace issues a command (e.g., gather_tuple_list), responsive to the request, to a tuple space manager 500 attached to its node 110 to cause a gathering of a tuple list. That is, the tuple records of the same name are gathered under the same hash element 570, which is a function of the key-value store 570. The tuple data is stored in SCM 515. Parameters in the command might include a tuple name under which the data is gathered, a list of node and process IDs and addresses where data is present and a list of sizes of each data. This is illustrated in FIG. 7 by the tuple space manager 500 and the command gather_tuple_list with the parameters of tuple name (e.g., "tuple name 1"), a nodeID list of nodes 110 where data 720-0 through 720-n might be stored, a processID list (e.g., containing process IDs of the processes 710-0 through 710-n), an addr list (e.g., comprising addresses 730-0 through 730-n where the corresponding data 720-0 through 720-n are stored), and a size list (e.g., comprising sizes of the corresponding data 720-0 through 720-n). It is noted that a list herein may also be referred to as an array, since an array is one implementation of a list.

In block 640, a tuple space manager 500 at a preferred home receives the request, and requests a memory (e.g., scm) controller for a location where the data needs to be gathered. The size of data is an aggregate of all data sizes.

That is, an accumulation of sizes in the content of the size array. It is noted that the process in FIG. 6 might start at a local tuple space manager 500 that is not at the preferred home, and block 640 concerns what happens at the preferred home. How the flow might get from the local tuple space manager 500 to the tuple space manager 500 at the preferred home is described below, in reference to FIGS. 6A and 6B.

In block 650, the tuple space manager 500 processes the array (having a size) of data list one at a time, performing a remote memory access (e.g., RDMA) load to retrieve the data to a temporary buffer 790 in the preferred home where this request is being processed. To access data on a remote node, the tuple space controller 500 uses the process ID, address, and size as part of the RDMA protocol message setup. The DMA operations need not be blocking and can be issued one after another without waiting for completion. That is, a "normal" DMA operation would have to wait until a previous DMA operation was complete, and this DMA operation would therefore be blocked until the previous DMA operation is complete. In this example, however, the DMA operations can be issued effectively in parallel and one DMA operation does not block another.

In block 660, from the temporary buffer 790 on the preferred home, the tuple space manager 500 then moves the data to the scm address space (e.g., in SCM 515). Upon aggregating in block 670 all the data together to the scm controller space, the tuple space manager 500 completes the creation of the tuple record and links the tuple record in the hash table linked list. In FIG. 7, blocks 660 and 670 are illustrated by the Hash Element 1 575-1, having a tuple name of "tuple name 1" and having an LT head ptr 580-1 to a single tuple 740. All of the gathered data is stored in a single memory block that is accessed by this single tuple 740. As illustrated in block 751 of FIG. 7, the single tuple 740 has information linking (e.g., referencing) to the data (e.g., the memory block containing the data) in the SCM.

In block 680, the preferred node then issues a completion notification to the requesting node where the original request to gather was received. The preferred home also notifies a natural home about the creation of the tuple record. The requesting node's tuple space manager in block 690 sends the completion notification to the user space, informing the user process that requested the gather of data.

As described above, the flow might get from the local tuple space manager 500 to the tuple space manager 500 at the preferred home is described below, in reference to FIGS. 6A and 6B. As an introduction, a preferred home is essentially a user-provided home suggesting where a tuple record should first be stored or sought from. If user does not provide one, then the system defaults to a natural home. It might be the case that user predicts incorrectly the preferred home, and tuple space manager queries for the tuple record location from the natural home and identifies the "actual home" of the tuple record and the associated data. The data itself is on the SCM 515 attached to the node 110 where the tuple record exists.

Figure 6A:
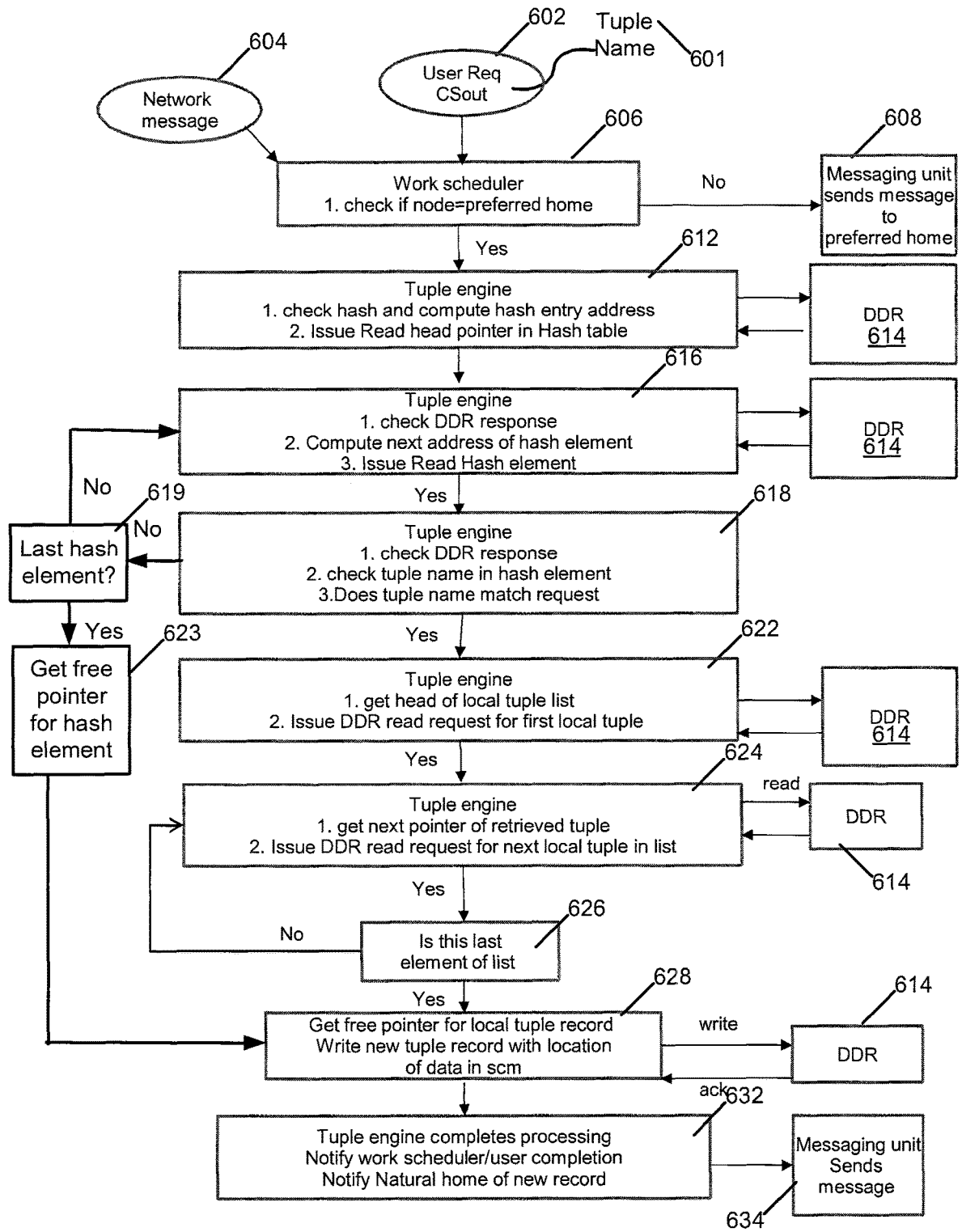
FIG. 6A is a flowchart of a method for performing a csOut command, which creates a new tuple in CNS.

FIG. 6A is a flowchart of a method for performing a csOut command, which creates a new tuple in CNS. For csOut, a preferred home becomes an actual home. In block 602, a user requests a csOut, and this includes a tuple name 601. For instance, a user using a node 100 can make this request, and the node 110 contacts its tuple space manager 500 with the request. In block 606, the work scheduler 620 checks if the current node is the preferred home. If not (No), the flow proceeds to block 608, where the messaging unit 535 (e.g., under control of the input work scheduler 520) sends a message to the preferred home. The network message 604 is an incoming message 506 from another node. There are several types of messages, e.g., from forwarding packets to control messages, and the like, going between nodes in support of CNS. Here, the network message 604 is referring to the forwarded packet that was sent off node in block 608 of a requesting node and the messages reaches the destination node and enters the flow in box 604. Thus, one node for this csOut performs blocks 602, 606, and 608, and a second node receives the network message 604 (e.g., comprising the csOut), performs block 606 then proceed to block 612.

If the current node is the preferred home (Yes), the tuple engine 530 (e.g., one of the tuple engines 530-1 through 530-N) checks the hash and computes a hash entry address, and issues a Read head pointer command to read into the hash table. The blocks that access the DDR memory 614 are shown in the figure. Block 612, for instance illustrates a DDR memory 614 is accessed. As previously described, in an exemplary embodiment, DDR is where the tuple records are stored and SCM is where tuple data is stored. DDR/DRAM is attached to a processor or processors through, e.g., memory DDR slots while SCM is attached through, e.g., PCI cards, in an exemplary embodiment. The tuple name 601 is an array of "bits" and a hash is a unique function that reduces these bits into a number. It is possible that more than one tuple name can reduce to the same hash. Hence, there is a need to search within the same hash index, for each hash element to see if the element matches the tuple name. The record retrieved might indicate the presence of the tuple record either locally or the retrieved record might indicate that the tuple record is in another home, called an actual home (i.e., the preferred home provided by a user was incorrect, and the natural home tells the correct home for the tuple record). Some of the blocks below perform this searching.

In block 616, the tuple engine 530 checks the DDR response, computes a next address of the hash element, and issues a Read hash element command, which is used to access the DDR memory 614. If a hash element is not found (No), this means there is no hash element for the hash index. The tuple engine 530 needs to create new hash element record and then goes to block 628 to create a tuple record.

If the hash element is found (Yes), in block 618, the tuple engine 530 checks the DDR response, checks the tuple name in the hash element, and does a tuple name match request. If the tuple name match request indicates the tuple name is the same as in the user request (tuple name 601) of block 602 (Yes), in block 622, the tuple engine 530 gets the head of a local tuple list, issues a DDR Read head request for a first local tuple, and accesses the DDR memory 614. Block 622 assumes the first local tuple is retrieved. If the tuple name match request indicates no tuple match (No), in block 619, it is determined if this is the last hash element. If not (No), the flow proceeds to block 616. If it is the last hash element (Yes), the flow proceeds to block 623, where the tuple engine 530 gets a free pointer for a hash element and the flow proceeds to block 628.

In block 624, the tuple engine 530 gets the next pointer of the retrieved tuple, issues a DDR read request for the next local tuple in the list, and accesses the DDR memory 614. If the next tuple is retrieved (Yes), in block 626, the tuple engine 530 determines if this is the last element in the list. If not (No), the flow proceeds back to 624. If so (Yes), in block 628, the tuple engine 530 gets a free pointer for the local tuple record, writes a new tuple record with location of the data in the scm (also referred to as SCM) and accesses the DDR memory 614 to access the SCM 515. The tuple engine 530 in block 632 completes processing, notifying the work queue 521 and the user of completion. The tuple engine 530 also notifies the natural home of the new record and in block 634 a messaging unit 535 (e.g., under control of the input work scheduler 520) send one or more messages to the user and/or the natural home.

Figure 6B:
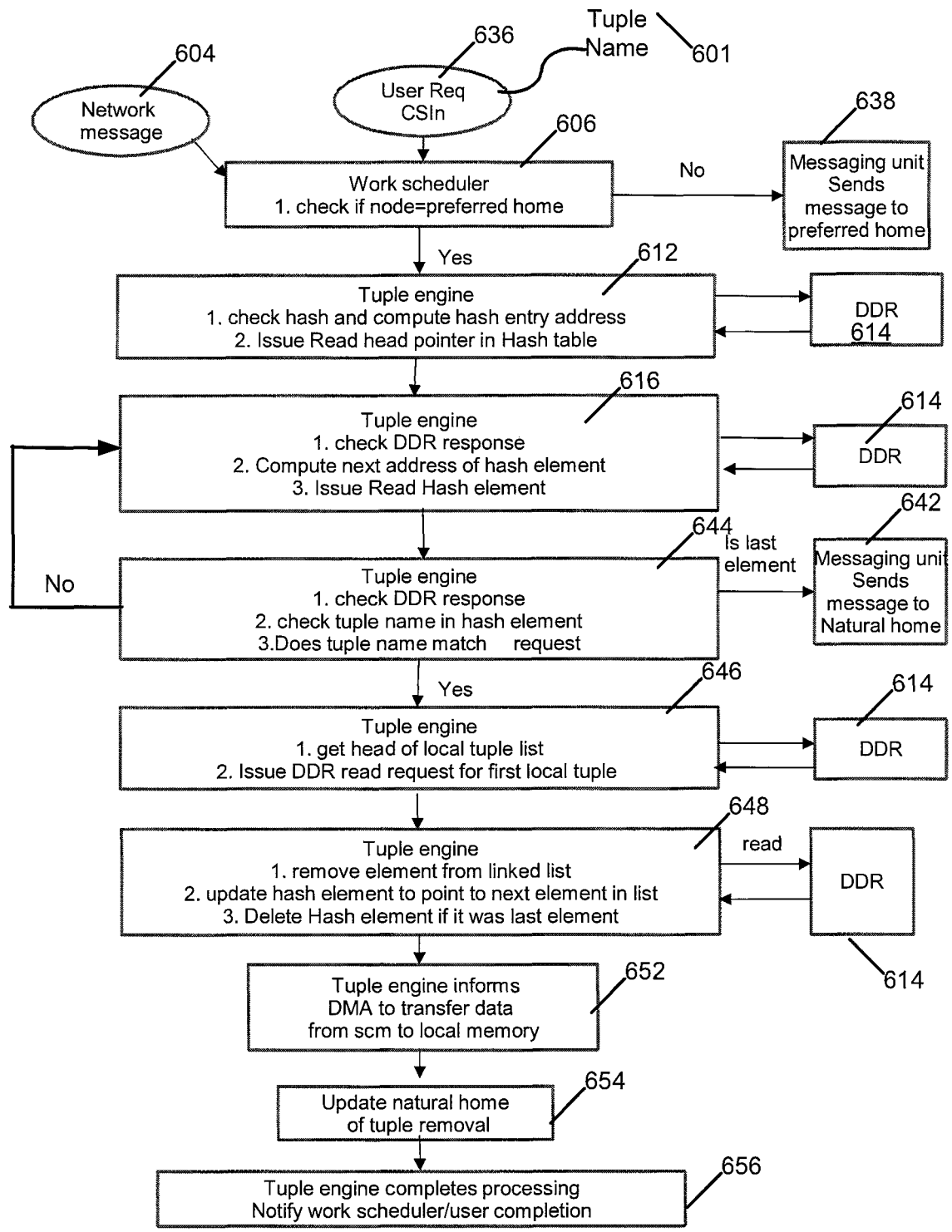
FIG. 6B is a flowchart of a method for performing a csIn command, which retrieves and removes a matching tuple from CNS.

Referring to FIG. 6B, this figure is a flowchart of a method for performing a csIn command, which retrieves and removes a matching tuple from CNS. In block 636, a user issues a request csIn command, including a tuple name 601, which is sent to the input work scheduler 520. For instance, a user using a node 100 can make this request, and the node 110 contacts its tuple space manager 500 with the request. Blocks 604, 606, 612 and 616 are similar or the same as FIG. 6A. However, for block 616 in FIG. 6B, there should be no need to create a hash element (as this process in FIG. 6B retrieves hash elements already created). If the current node 110 is not (No) the preferred home, the flow proceeds to block 638, where the messaging unit 535 (e.g., under control of the input work scheduler 520) sends a message to the preferred home. This is similar to block 608 of FIG. 6A, except that the message being sent is a csIn (instead of the csOut of block 608).

In block 644, the tuple engine 530 checks the DDR response, checks the tuple name in the hash element, and determines whether the tuple name matches the tuple name 601 in the request. Note if this is the last element (Is last element), in block 642, the tuple engine 530 sends a message to the natural home. In other words, if the end of hash element linked list ("linkedlist") has been reached, go to block 642, because the element does not exist on this node, and send a request to the natural home. Note that at the natural home, the processing goes through the same flow from beginning, while checking whether the node=natural home. If the node still does not find the entry, the node creates a hash element with a pending record (PR, see below for a description) for this request, expecting a csOut for that tuple name in the future.

If there is no name match, then the flow proceeds back to block 616, where another Read Hash element is performed. That is, the next hash element in the linked list is retrieved. If there is a name match (Yes), in block 646, the tuple engine 530 gets a head of a local tuple list, and issues a DDR read request for the first local tuple, and accesses the DDR memory 614. In block 648, the tuple engine 530 removes the element from the linked list, updates the hash element to point to the next element in the list, and deletes the hash element if the hash element was the last element. This accesses (e.g., via a read) the DDR memory 614. In block 652, the tuple engine 530 informs the DMA to transfer data from the scm (e.g., SCM 515) to local memory (e.g., system memory 505). The natural home is updated, by the tuple engine 530, in block 654 of the tuple removal. In block 656, the tuple engine 530 completes processing and notifies the input work scheduler 520 and/or the user of the completion.

The techniques in FIGS. 6A and 6B apply to the other flowcharts herein. For instance, FIGS. 8, 10, and 12 can use one or both of these techniques. Note also that the tuple name 601 is only one parameter that might be sent in a request. Other parameters are illustrated, for instance, in FIGS. 11 and 13.

Figure 8:
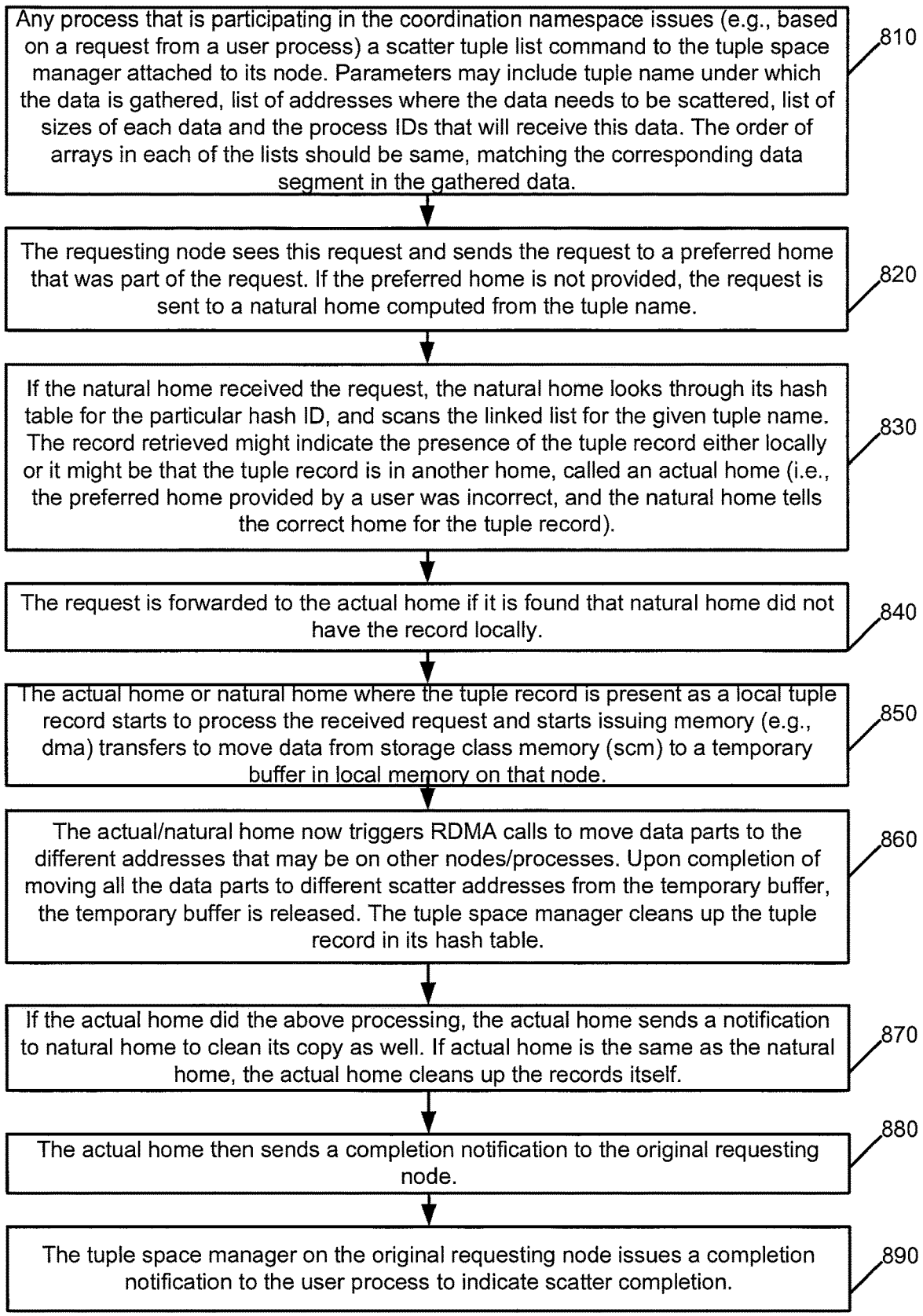
FIG. 8 is a flowchart of a method of a first approach to scatter data from a multipart tuple, previously stored from a gather operation in a single contiguous memory location.
Figure 9:
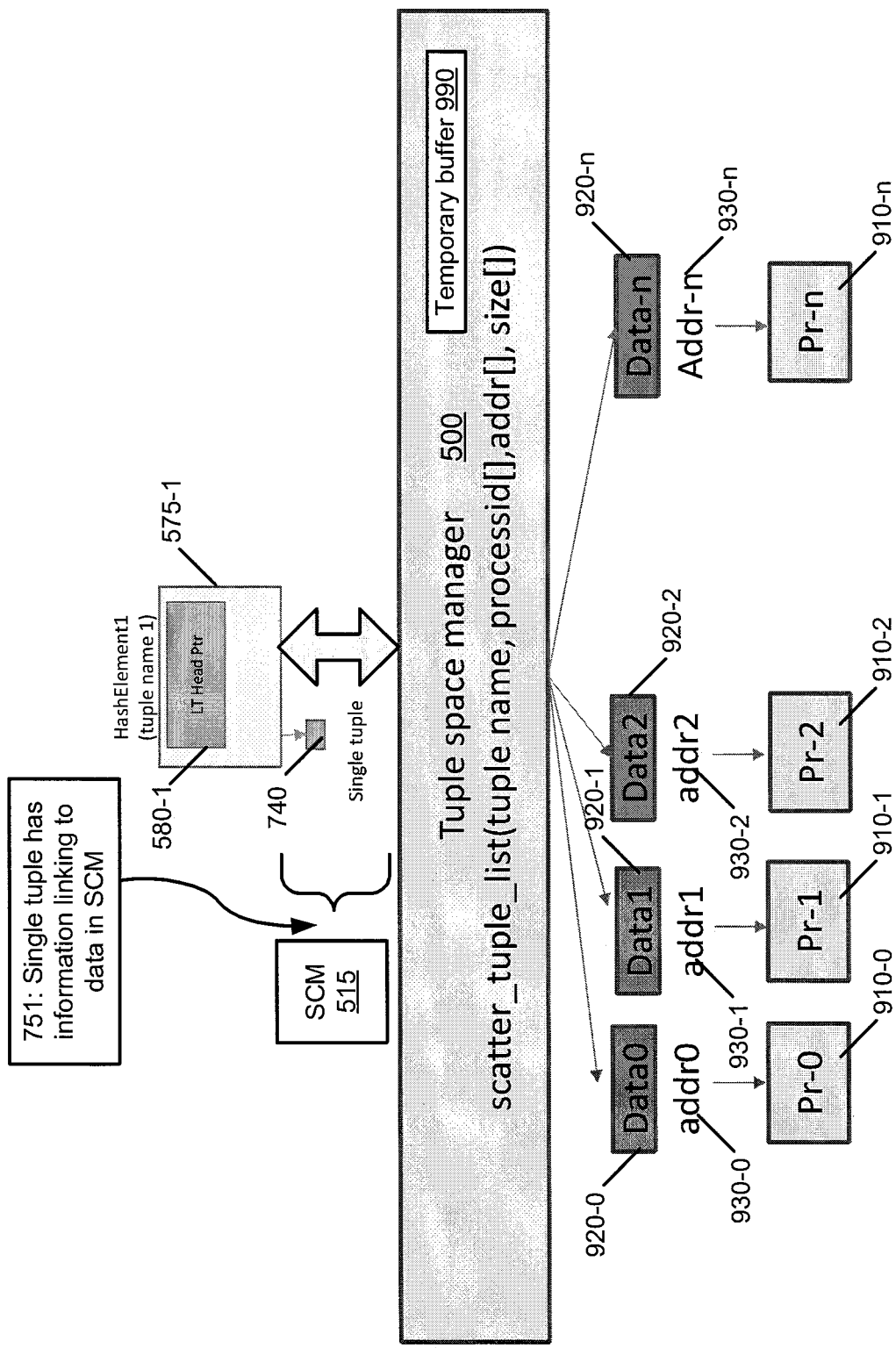
FIG. 9 is an illustration of tuple space manager interactions for the method in FIG. 8.

Turning to FIGS. 8 and 9, FIG. 8 is a flowchart of a method of a first approach to scatter data from a multipart tuple, previously stored from a gather operation in a single contiguous memory location, and FIG. 9 is an illustration of tuple space manager interactions for the method in FIG. 8.

In block 810, any process that is participating in the coordination namespace issues (e.g., based on a request from a user process) a scatter tuple list command to the tuple space manager attached to its node. Parameters may include tuple name under which the data is gathered, list of addresses where the data needs to be scattered, list of sizes of each data and the process IDs that will receive this data. The order of arrays in each of the lists should be same, matching the corresponding data segment in the gathered data. This is illustrated in FIG. 9 by the scatter_tuple_list (tuple name, nodeID[ ], processID[ ], addr[ ], size[ ]). In this example, the tuple name is "tuple name 1" as illustrated by Hash Element 1 575-1.

In block 820, the requesting node sees this request and sends the request to a preferred home that was part of the request. If the preferred home is not provided, the request is sent to a natural home computed from the tuple name. As previously described, a preferred home is user-provided. It is a definition used for common tuple operations for csOut, csIn too. The user could incorrectly predict where the tuple record may be found, and hence the need to consult with the natural home. If the preferred home is predicted correctly, then the tuple processing can be performed right there and the tuple processing engine updates the natural home accordingly.

In block 830, if the natural home received the request, the natural home looks through its hash table for the particular hash ID, and scans the linked list for the given tuple name. The hash ID is computed from the tuple name. When the request for csIn/csOut is issued, either the CNS software layer or CNS hardware computes the hash ID from the tuple name and appends the hash ID as part of the request going further into the CNS tuple processing. The tuple name is an array of "bits" and hash is a unique function that reduces these bits into a number. It is possible that more than one tuple name can reduce to the same hash. Hence, there is a need to search within the same hash index, for each hash element to see if the element matches the tuple name. The record retrieved might indicate the presence of the tuple record either locally or the retrieved record might indicate that the tuple record is in another home, called an actual home (i.e., the preferred home provided by a user was incorrect, and the natural home tells the correct home for the tuple record).

In block 840, the request is forwarded to the actual home if it is found that natural home did not have the record locally. In block 850, the actual home or natural home where the tuple record is present as a local tuple record starts to process (e.g., via the tuple space manager 500) the received request and starts issuing memory (e.g., DMA) transfers to move data from storage class memory (scm) to a temporary buffer in local memory on that node. That is, from FIG. 8, the tuple space manager 500 accesses the data in the SCM 515 based on information from the single tuple 740 linking (e.g., referencing) the data (e.g., the memory block containing the data) in the SCM 515, and moves this data to a temporary buffer 990.

The actual/natural home now triggers (see block 860) RDMA calls to move data parts to the different addresses that may be on other nodes/processes. Upon completion of moving all the data parts to different scatter addresses from the temporary buffer, the temporary buffer 990 is released. The tuple space manager 500 cleans up the tuple record in its hash table. In FIG. 9, this is illustrated by the data being scattered from the single tuple 740 and the temporary buffer 990 to the data data0 920-0, data1 920-1, data2 920-2, through data-n 920-n, each at a corresponding address addr0 930-0, addr1 930-1, addr2 930-2, through addr-n 930-n. The data data0 920-0, data1 920-1, data2 920-2, through data-n 920-*n* also corresponding to processes Pr-0 910-0, Pr-1 910-1, PR-2 910-2, through PR-n 910-*n*.

In block 870, if the actual home did the above processing, the actual home sends a notification to natural home to clean its copy as well. If actual home is the same as the natural home, the actual home cleans up the records itself. The actual home in block 880 then sends a completion notification to the original requesting node. In block 890, the tuple space manager 500 on the original requesting node issues a completion notification to the user process to indicate scatter completion.

A second approach is to store the multipart tuple in multiple memory locations. This approach needs to maintain a linked list ("linkedlist") in the key-value store that provides address of these individual gathered tuple records. This is implicit gathering of tuples at a preferred home using a tuple space manager, where data can be from multiple processes. Data can stay fragmented in storage class memory. Only the tuple information is gathered together in one hash element record.

Figure 10:
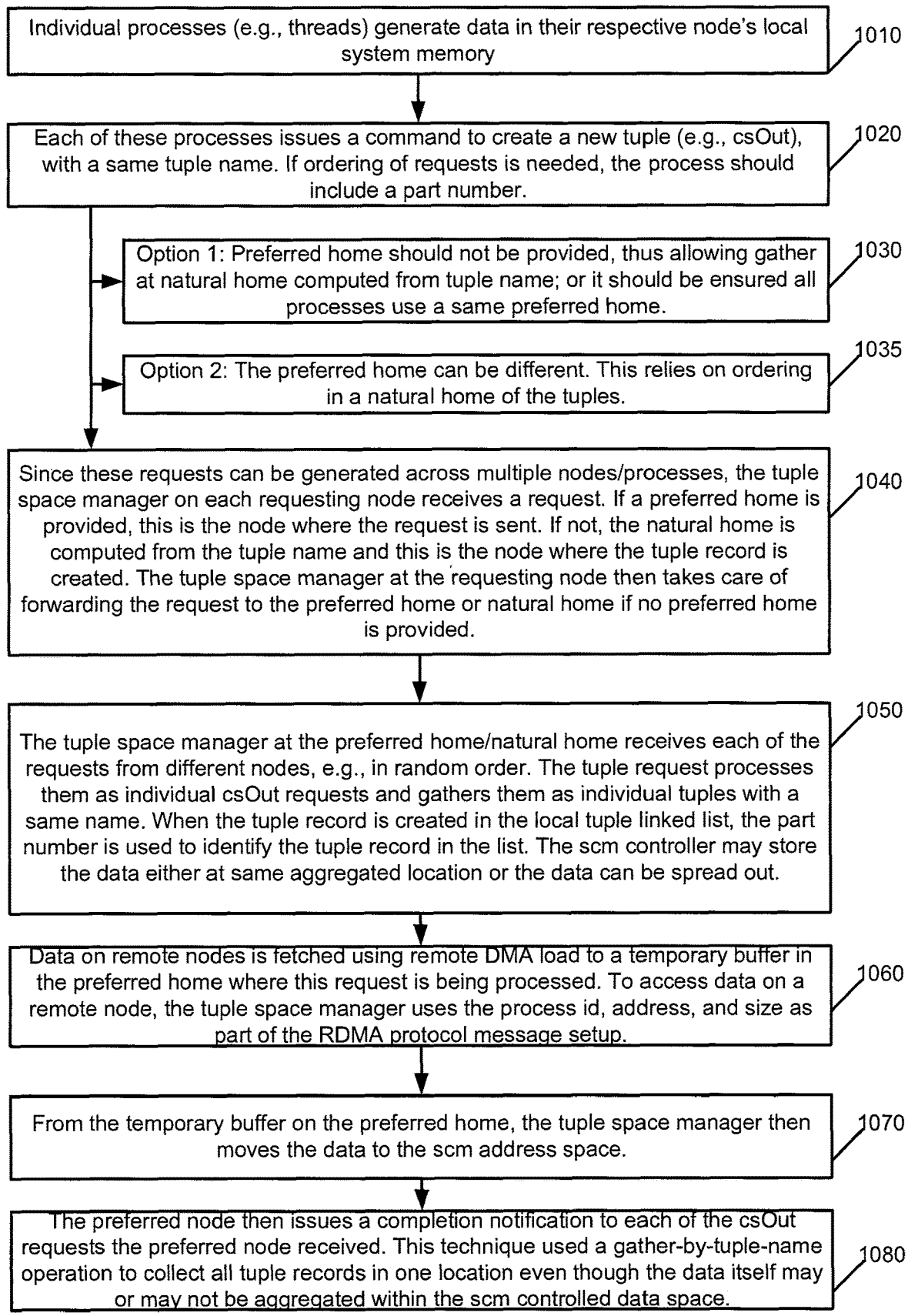
FIG. 10 is a flowchart of a method of a second approach to store a multipart tuple from a gather operation in multiple memory locations.
Figure 11:
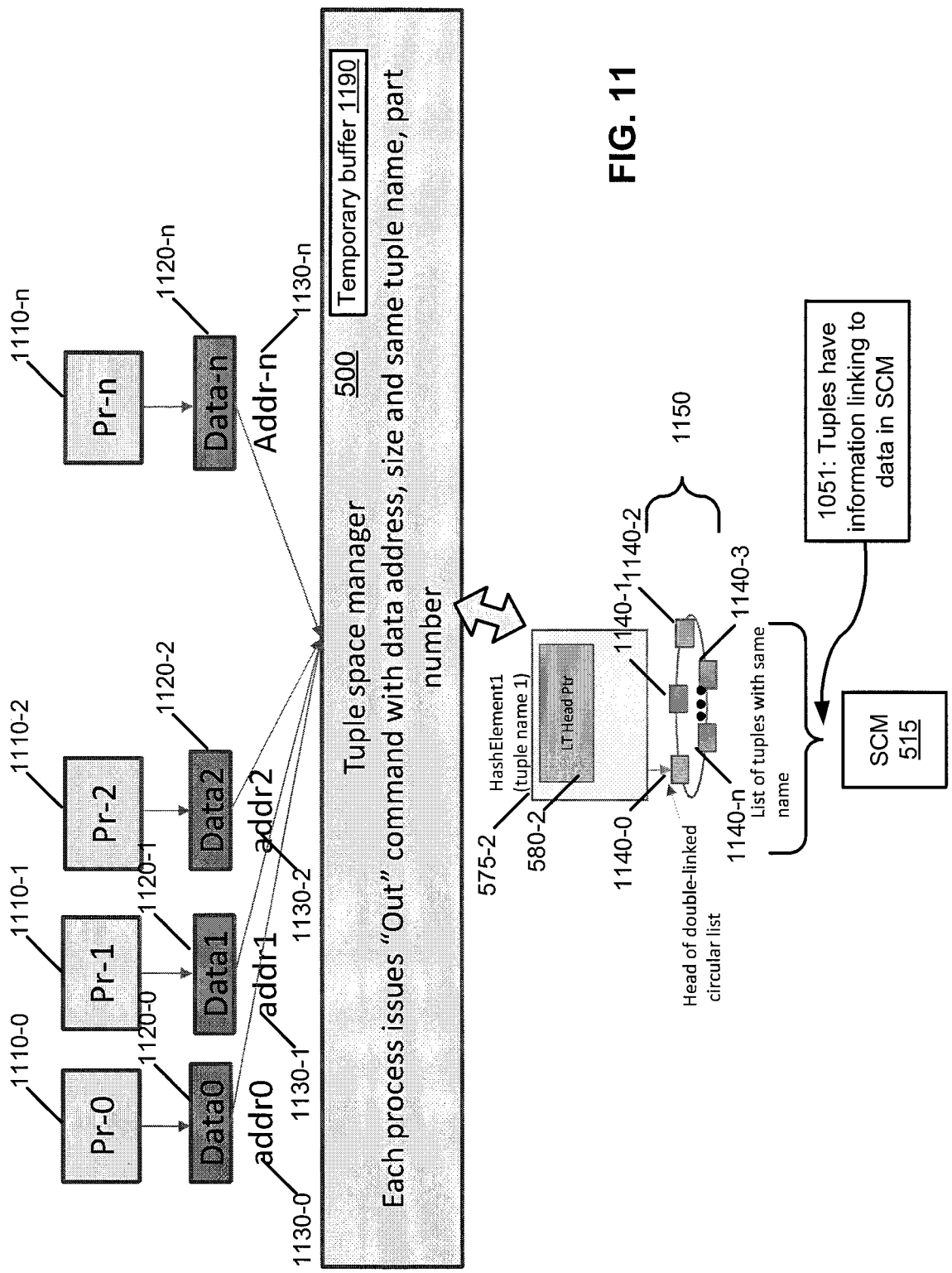
FIG. 11 is an illustration of tuple space manager interactions for the method in FIG. 10.

Turning to FIGS. 10 and 11, FIG. 10 is a flowchart of a method of a second approach to store a multipart tuple from a gather operation in multiple memory locations, and FIG. 11 is an illustration of tuple space manager interactions for the method in FIG. 10. In block 1010, the individual processes (e.g., threads) generate data in their respective node's local system memory. This is illustrated in FIG. 11 by the processes Pr-0 1110-0, Pr-1 1110-1, PR-2 1110-2, through PR-n 1110-*n*, which create corresponding data data0 1120-0, data1 1120-1, data2 1120-2, through data-n 1120-*n*. Each of these data is at a corresponding address addr0 1130-0, addr1 1130-1, addr2 1130-2, through addr-n 1130-*n*. This is an address in system memory (e.g., system memory 505) where the data is currently located in user process space. The process ID and this address are needed to translate from virtual address to real address in the system memory of the given node to access the data. The process ID is required to get permission from the OS to access that address space.

In block 1020, each of these processes issues a command to create a new tuple, with a same tuple name. If ordering of requests is needed, the process should include a part number. The command to create a new tuple may be csOut, as illustrated in FIG. 14 as an API and as described in reference to FIG. 6A. In FIG. 11, this is illustrated as each thread issuing an "Out" command with parameters of data address, size and a same tuple name, and part number. In FIG. 6A, this is the user request of csOut in block 602. The part number is a sequence number of the gathered list if one wishes to maintain this order. It is noted that data can stay fragmented in storage class memory, and that only the tuple information may be gathered together in one hash element record. This is illustrated by block 1051, where the tuples have information linking from the tuples to the corresponding data in the SCM 515.

There are two options. In option 1 (see block 1030), the referred home should not be provided, thus allowing gather at a natural home computed from tuple name; or it should be ensured all processes use a same preferred home. In option 2 (see block 1035), the preferred home can be different. This relies on ordering in a natural home of the tuples.

In block 1040, since these requests can be generated across multiple nodes/processes, the tuple space manager on each requesting node receives a request. If a preferred home is provided, this is the node where the request is sent. If not, the natural home is computed from the tuple name and this is the node where the tuple record is created. The tuple space manager at the requesting node then takes care of forwarding the request to the preferred home or natural home if no preferred home is provided.

In block 1050, the tuple space manager 500 at the preferred home/natural home receives each of the requests from different nodes, e.g., in random order. The tuple request processes them as individual csOut requests and gathers them as individual tuples with a same name. When the tuple record is created in the local tuple linked list, the part number is used to identify the tuple record in the list. The scm controller may store the data either at a same aggregated location or the data can be spread out. In block 1060, data on remote nodes is fetched using remote DMA load to a temporary buffer 1190 (see FIG. 11) in the preferred home where this request is being processed. To access data on a remote node, the tuple space manager uses the process id, address, and size as part of the RDMA protocol message setup.

In block 1070, from the temporary buffer 1190 on the preferred home, the tuple space manager then moves the data to the scm address space. In the example of FIG. 11, this is illustrated by the Hash Element 1 575-2, with a tuple name of "tuple name 1". The Hash Element 1 575-2 has an LT heat pointer (ptr) 580-2 that points to (e.g., references) the head 1140-0 of a double-linked circular list 1150, which has tuples 1140-0, 1140-1, 1140-2, 1140-3, . . . , 1140-*n*. That is, tuples 1140 are the tuple records. These records have information on where the data is physically stored in SCM 515. The data got moved from data 1120 (at their corresponding addresses 1130) to SCM 515. In other words, the tuples 1140 do not contain the data 1120, but instead contain information linking (e.g., referencing) the data 1120 in SCM 515. The double-linked circular list 1150 is a list of tuples 1140 with a same name.

In block 1080, the preferred node then issues a completion notification to each of the csOut requests the preferred node received. This technique used a gather-by-tuple-name operation to collect all tuple records in one location even though the data itself may or may not be aggregated within the scm controlled data space. In an exemplary embodiment, linked list support is built in for CNS. Tuple records associated with tuples of the same name automatically get gathered under the same hash element at the natural home/preferred home. Implicit means utilizing this built-in mechanism. The data gets moved from system memory/user process space to scm and may be in separate blocks within scm depending on the address given by the heap manager for each tuple record. No attempt is made to allocate a single large block of SCM memory. Instead, it is possible to gather the data under multiple tuple records belonging to the same hash element. Therefore, the data is now under the master/scm process. The objective is to allow sharing this data with other processes. A different process participating in the CNS can now come and read all the aggregated data by scanning through the linked list ("linkedlist") associated with this hash element (via a key).

Figure 12:
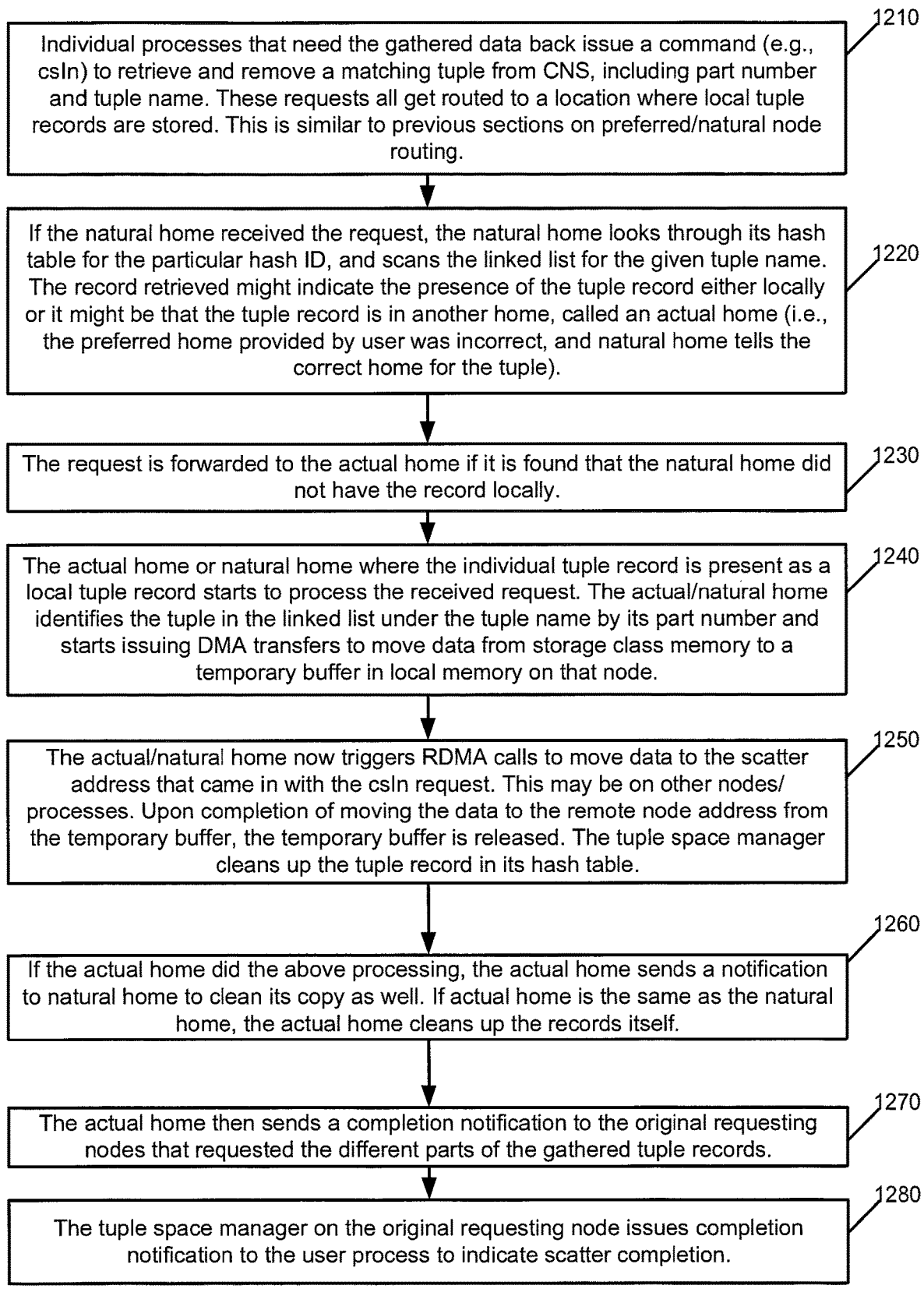
FIG. 12 is a flowchart of a method of a second approach to scatter data from a multipart tuple, previously stored from a gather operation in multiple memory locations.

Referring to FIGS. 12 and 13, FIG. 12 is a flowchart of a method of a second approach to scatter data from a multipart tuple, previously stored from a gather operation in multiple memory locations, and FIG. 13 is an illustration of tuple space manager interactions for the method in FIG. 12.

In block 1210, individual processes that need the gathered data back issue a command (e.g., csIn, see FIG. 14) to retrieve and remove a matching tuple from CNS, including part number and tuple name. These requests all get routed to a location where local tuple records are stored. This is similar to previous sections on preferred/natural node routing. This is illustrated in FIG. 13 by each process/thread issuing "In" with addr (address), size (e.g., for the data) and same name, and part number in the tuple space manager 500.

In block 1220, if the natural home received the request, the natural home looks through its hash table for the particular hash ID, and scans the linked list 1150 (see FIG. 13) for the given tuple name. As previously described, the hash ID is computed either in software or in hardware and is a hash of the tuple name. The name is really a set of bits, and a hash is performed on this to generate a number which is used as a hash index. The record retrieved might indicate the presence of the tuple record either locally or it might be that the tuple record is in another home, called an actual home (i.e., the preferred home provided by user was incorrect, and natural home tells the correct home for the tuple). In block 1230, the request is forwarded to the actual home if it is found that the natural home did not have the record locally.

In block 1240, the actual home or natural home where the individual tuple record is present, as a local tuple record, starts to process the received request. The actual/natural home identifies the tuple in the linked list 1150 under the tuple name by its part number and starts issuing DMA transfers to move data from storage class memory (scm) to a temporary buffer 1390 (see FIG. 13) in local memory on that node. Note that the tuples in the hash element 575-2 may, as indicated in block 1051 may have information linking from the tuples to data in SCM 515. In block 1250, the actual/natural home now triggers RDMA calls to move data to the scatter address (addr) that came in with the csIn request, which is the output address to where the data is copied to. See FIGS. 6A and 6B, which explain the csOut and csIn flows, respectively. This data may be on other nodes/processes. Upon completion of moving the data to the remote node address from the temporary buffer, the temporary buffer 1390 is released. The tuple space manager cleans up the tuple record in its hash table. This process is illustrated in FIG. 13 by the data data0 1320-0, data1 1320-1, data2 1320-2, through data-n 1320-n being output to their corresponding address addr0 1330-0, addr1 1330-1, addr2 1330-2, through addr-n 1330-n. Each of these addresses 1330 corresponds to an individual one of processes Pr-0 1310-0, Pr-1 1310-1, PR-2 1310-2, through PR-n 1310-n. The data is now scattered back to the processes 1310. It is noted that the processes in FIG. 11 and FIG. 13 t need not be the same. The process list for scatter and gather is expected to be different, but typically the number (n) of them is same. If n is not the same, then only the explicit scatter-gather works, as data is now scattered in chunks that are different from the original.

In block 1260, if the actual home did the above processing, the actual home sends a notification to natural home to clean its copy as well. If actual home is the same as the natural home, the actual home cleans up the records itself. The actual home in block 1270 then sends a completion notification to the original requesting nodes that requested the different parts of the gathered tuple records. The tuple space manager 500 in block 1280 on the original requesting node issues completion notification to the user process to indicate scatter completion.

As additional examples for the second approach, methods have been descried to implement creation of multi-part tuple using scatter and gather of data. For collection of the multi-part tuple, there is implicit gathering of tuples using a tuple space manager 500. The tuples of a same name are gathered together in one linked list. Data can stay scattered in storage class memory. When all parts are received, a tuple is created. This is the exemplary case of implicit gathering.

Each process essentially stored the data using csOut with same name, and the data got moved from system memory/local space to storage class memory. The tuple records are gathered under one hash element (also referred to as a named data element), but the data can remain scattered across the SCM. In an exemplary embodiment, no computation is performed on the data in SCM. Thus, the option to aggregate the data in one location in SCM is just an option.

Store ordering may be performed as follows: 1) Store in part order; or 2) Store out of order. For storage out of order, metadata is used to determine order when retrieved. Load ordering may be performed as follows: 1) Load in order as tuple was stored as sequential; or 2) Load by metadata or part number.

Insertion/search in tuple list may be performed according to part number. It is possible to speculatively return parts for loads, e.g., by loading all parts. In other words, if requests to retrieve the gathered tuple record comes in from different processes, then the tuple space manager 500 starts retrieving the records one-by-one from the hash table. This process takes time. If one can speculatively guess that the gather has initiated based on the first request, it is possible to proactively start retrieving all the tuple records in the same order as part number to hide (e.g., limit) the latency of retrieving linked-list data. Parts refers to the sequence number of the data in the list/array.

Turning to FIG. 14, a table is shown illustrating possible exemplary commands between CNS controllers in accordance with an exemplary embodiment. The following rows are shown: Software API, which lists the software API function called to perform the corresponding action in the "Description" row; Hardware opcode, which lists a corresponding opcode that is implemented in hardware; and Description, which describes the action taken by the hardware in response to the opcode. As examples, the csOut for the software API would create a new tuple in CNS, and the csIn retrieves and removes a matching tuple from CNS.

FIG. 15 illustrates a special case of scatter gather in an exemplary embodiment. This uses the example from FIG. 13, which uses the second approach for scatter gather operations, where the multipart tuple for scatter gather operations is stored in multiple memory locations. However, this special case could also use the first approach (see FIG. 9) for scatter gather operations, where a multipart tuple for scatter gather operations is stored in a single contiguous memory location. FIG. 15 illustrates using the implicit scatter/gather feature to gather data located across different processes into one memory location of a given process. So all the participating processes would gather like before, but for scatter, the data are written back to a same process in adjacent data blocks. This creates an aggregated data. From a user point of view, this is gathering data to one location in system memory.

FIG. 15 illustrates this by the command of scatter_tuple_list (tuple name, addr[ ], size[ ]) in the tuple space manager 500, which causes the tuple space manager 500 to transfer data from the linked list 1150 to the array 1510 of adjacent addresses indicated by the "addr[ ]" array. This example shows the end result is a single hash element, which is identified by a tuple name, and is indicated by the array 1510. The array 1510 begins at addr0 1330-0 and ends n addresses later. The size[ ] array indicates the size of each corresponding datum in the data data0 1320-0, data1 1320-1, data2 1320-2, . . . , data-n 1320-n. One can calculate size from the spacing/striping between addresses, but it is safer to provide the size. The heap manager could have allocated a larger size to the data even though the data size is smaller.

The data is written by the tuple space manager 500 to a single process 1310, illustrated as process Pr-x 1310-x. As before the temporary buffer 1390 may be used as a temporary storage location during the scatter process.

FIGS. 16-20 illustrate examples of implementations of a key-value store for tuples, in accordance with exemplary embodiments. These figures illustrate field programmable gate array (FPGA) double data rate (DDR) hash structures 1600, which is one exemplary hardware implementation for these structures. It should be noted that FPGA is only one example of hardware, and it could be possible to implement some or all of this using computer readable code and corresponding processor(s). Also, DDR is one example of memory, and other memories may be used. Also, DDR memory should be the local memory that is close to the FPGA. See FIG. 5, where the key value store 570 has near memory 545. Hash structures are present within this local memory. The local memory can be any type of memory (e.g., DRAM, SDRAM, NVRAM), and DDR is just one such type of memory. The FPGA DDR hash structures 1600 are one exemplary way a key-value store 570 (see, e.g., FIG. 5) may be implemented.

Figure 16:
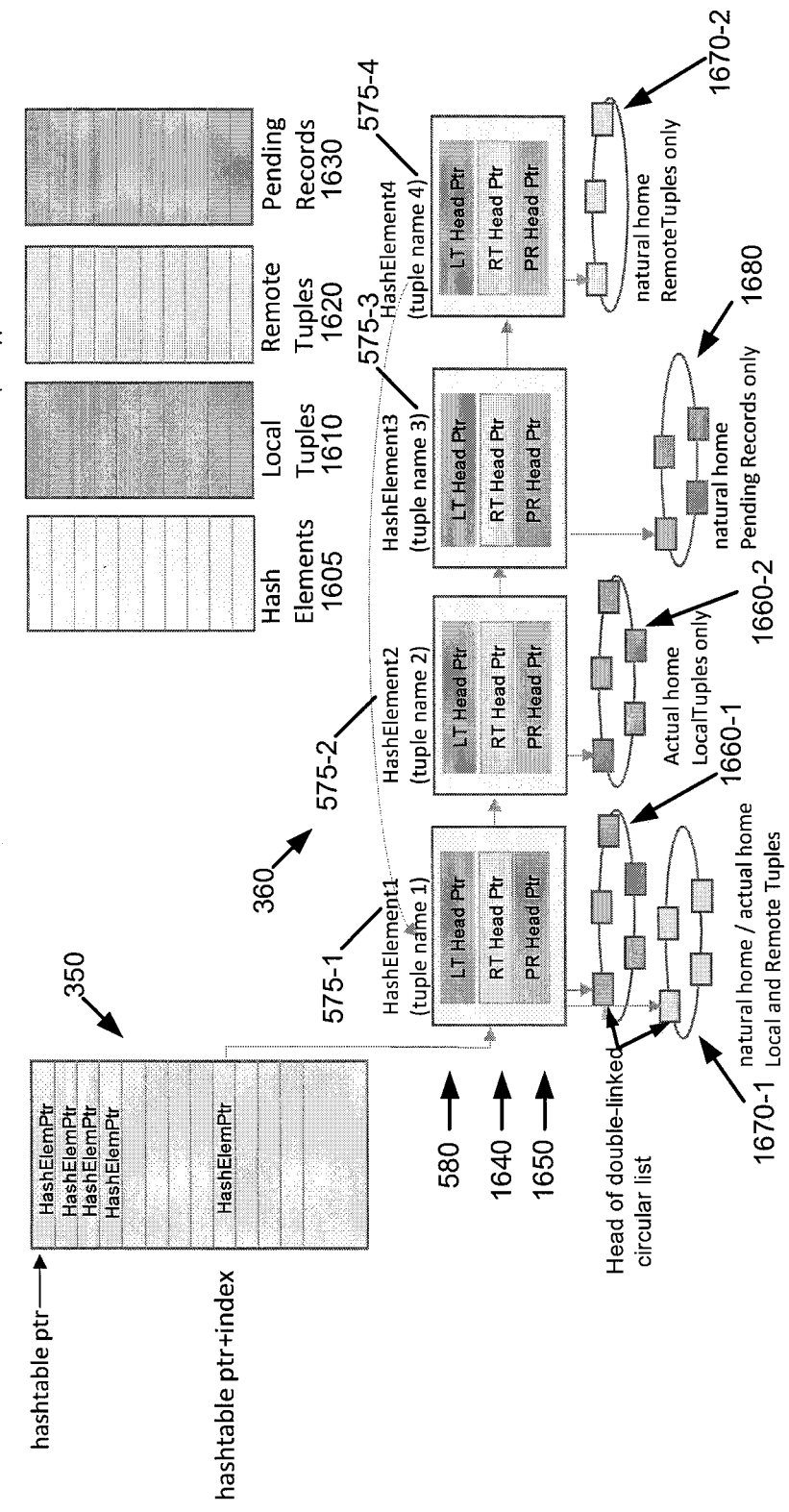
FIGS. 16-20 illustrate examples of implementations of a key-value store for tuples, in accordance with exemplary embodiments.

Turning to FIG. 16, this figure illustrates the FPGA DDR hash structures 1600 and reference numerals associated with the elements of the figure. For clarity, reference numerals that have been used previously are also referred to on FIG. 16, and new reference numerals have been added too. In FIG. 16, there is a hash table 350 with a hash table pointer (hashtable ptr). The entries in the hash table 350 are HashElemPtr, hash element pointers, which point to one of the hash elements 575. In the previous examples, there was only one hash element 575, but this example has multiple hash elements 575-1, 575-2, 575-3, and 575-4, which are formed in a linked list (hash element 575-1 points to hash element 571-2, which points to hash element 575-3, which points to hash element 575-4, and finally hash element 575-4 points to hash element 575-1, in a circular manner). The element at hastable ptr+index points to the hash element 575-1 of HashElement1. There are a number of free lists per type in the upper right-hand side: hash elements 1605; local tuples (LTs) 1610; remote tuples (RTs) 1620; and pending records (PRs) 1630.

Each of the hash elements 575 includes an LT Head Ptr 580, an RT Head Ptr 1640, and a PR Head Ptr 1650, although these may not be active. For the hash element 575-1, this has an LT Head Ptr that points to the head of a double-linked list 1660-1 and an RT Head Ptr that points to a head of a double-linked list 1670-1. The PR Head Ptr is not active. The natural home/actual home, local and remote tuples may be accessed via the lists 1660-1 and 1670-1, respectively. The hash element 575-2 has an LT Head Ptr that points to the head of a double-linked list 1660-2 and the RT Head Ptr and PR Head Ptr are not active. The actual home, local tuples only may be accessed via the list 1660-2. The hash element 575-3 has a PR Head Ptr that points to the head of a double-linked list 1680 and the LT Head Ptr and RT Head Ptr are not active. The natural home, pending record tuples only may be accessed via the list 1680. The hash element 575-4 has an RT Head Ptr that points to the head of a double-linked list 1670-2 and the LT Head Ptr and PR Head Ptr are not active. The natural home, remote tuples only may be accessed via the list 1670-2.

In more detail, the hash table 350 contains pointers to hash element linked lists. The index into the hash table is computed from a tuple name hash. Multiple tuple names can hash to a same index. And they are linked as a linked list of hash elements. Each hash element in that list would be for a unique tuple name. It is possible to have multiple tuples for the same name. A hash element 575 has pointers to a local tuple, remote tuples and pending records, all for the same tuple name. Each of the local tuples/remote tuples/pending records connected to a given hash element is connected to themselves as circular double-linked structures.

There are four possible combinations of allocation of tuple records in memory: 1) local and remote tuples associated with a tuple name hash element if it's a natural home or actual home; 2) if only local tuples are present, this indicates this is the actual home; 3) if only pending records present for a given tuple, this indicates it's the natural home, and PR cannot be present in actual homes; 4) if only remote tuple list is present for a given tuple name, this is the natural home for that tuple.

There are four types of free list memory buffers (1605, 1610, 1620, 1630), one for each type that is needed to form these linked list structures. When the tuple engine needs to create an entry in these linked structures, the tuple engine picks up the entry from the free lists 1605, 1610, 1620, 1630 of the given type. These are described on the next figures.

Figure 17:
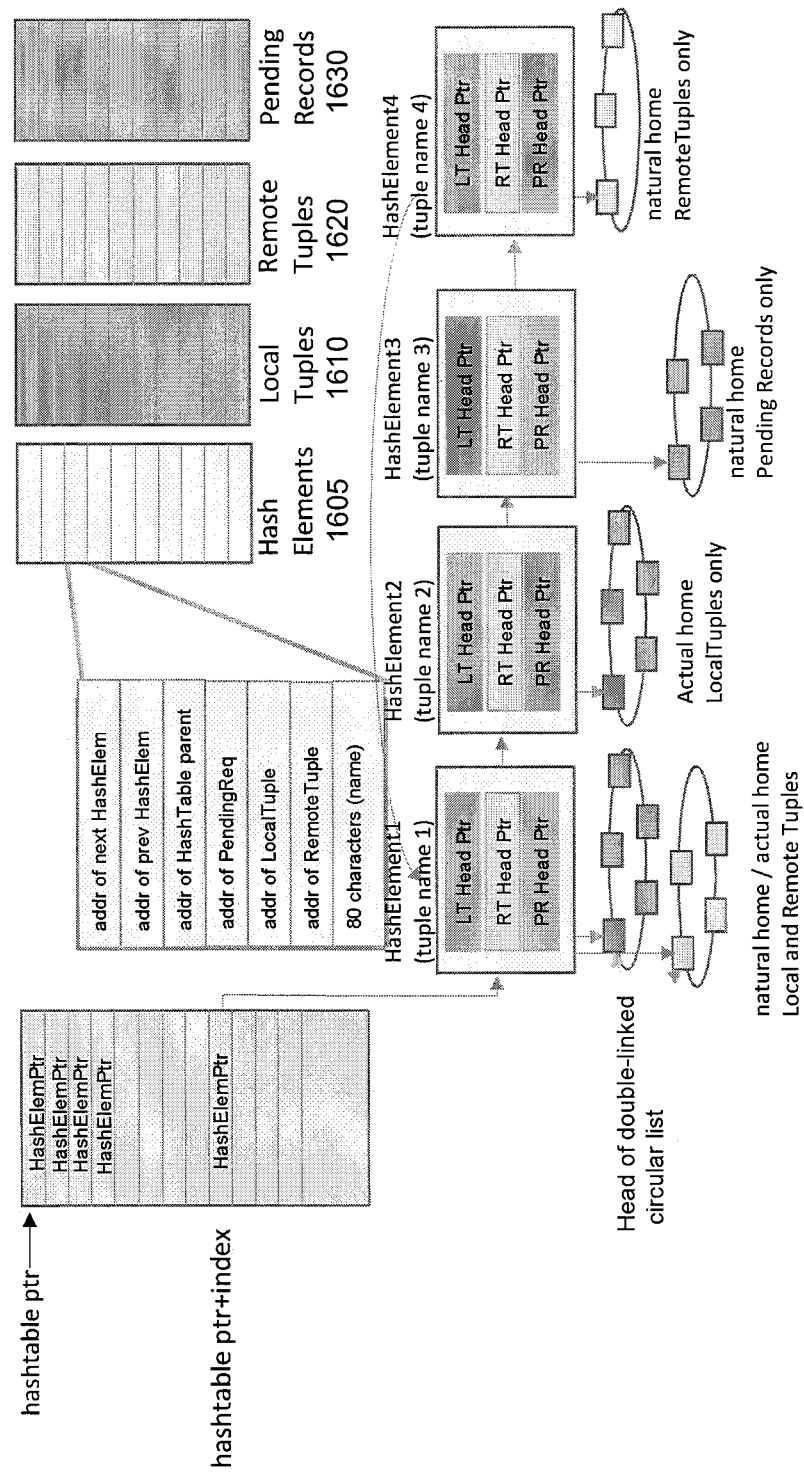

Referring to FIG. 17, this figure illustrates fields for a hash element in the hash elements 1605: the address of the next hash element (addr of next HashElem); the address of the previous hash element (addr of prev HashElem); the address of the hast table parent (addr of HashTable parent); the address of a pending request (addr of PendingReq); the address of the local tuple (addr of LocalTuple); the address of the remote tuple (addr of RemoteTuple); and 80 characters (name) (e.g., for the tuple name).

Figure 18:
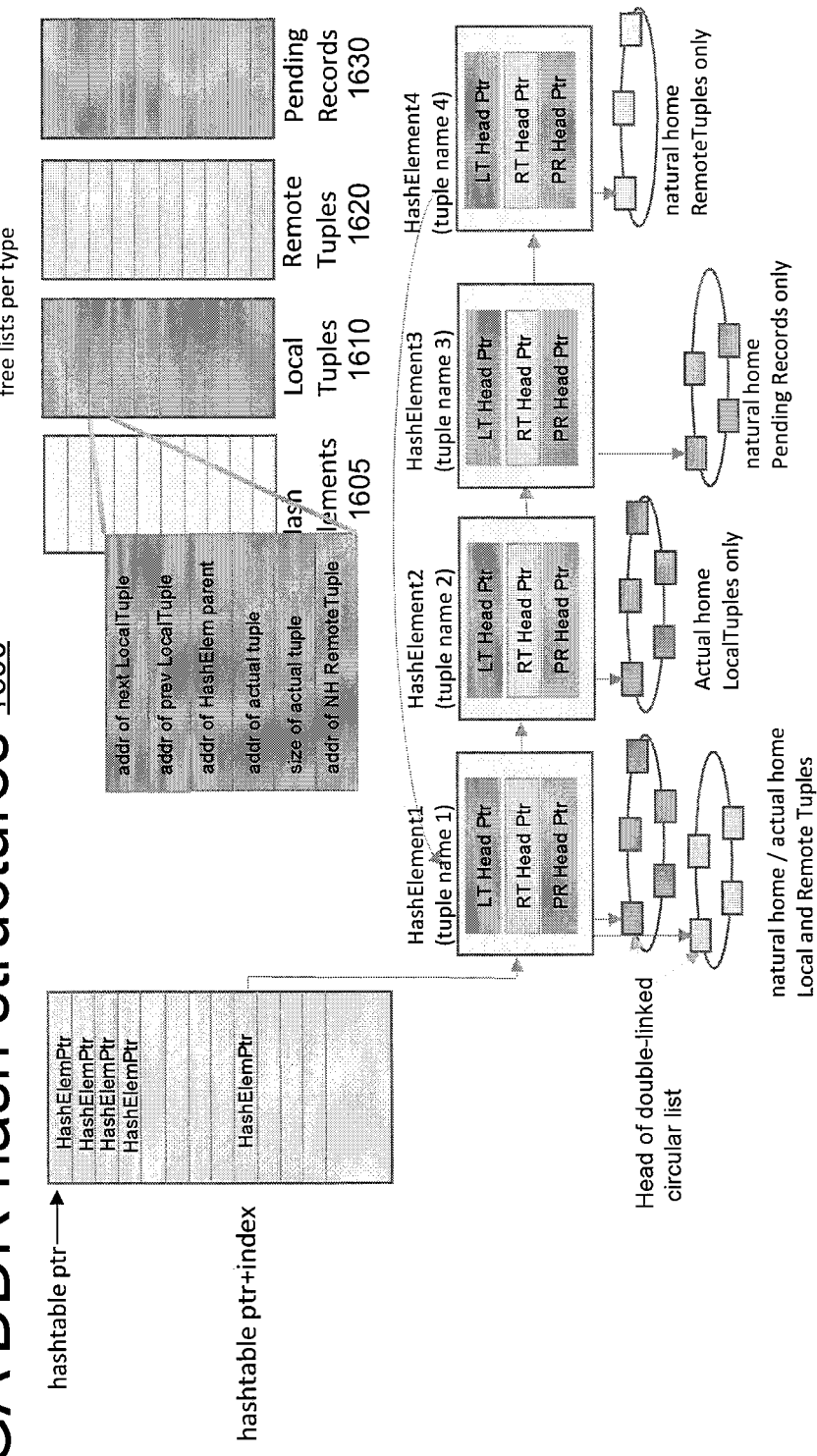

Referring to FIG. 18, this figure illustrates fields for an element in the local tuples 1610: address of the next local tuple (addr of next LocalTuple); address of the previous local tuple (addr of prev LocalTuple); address of the hash element parent (addr of HashElem parent); address of the actual tuple (addr of actual tuple); the size of the actual tuple (size of actual tuple): and the address of the natural home (NH) remote tuple (addr of NH RemoteTuple).

Figure 19:
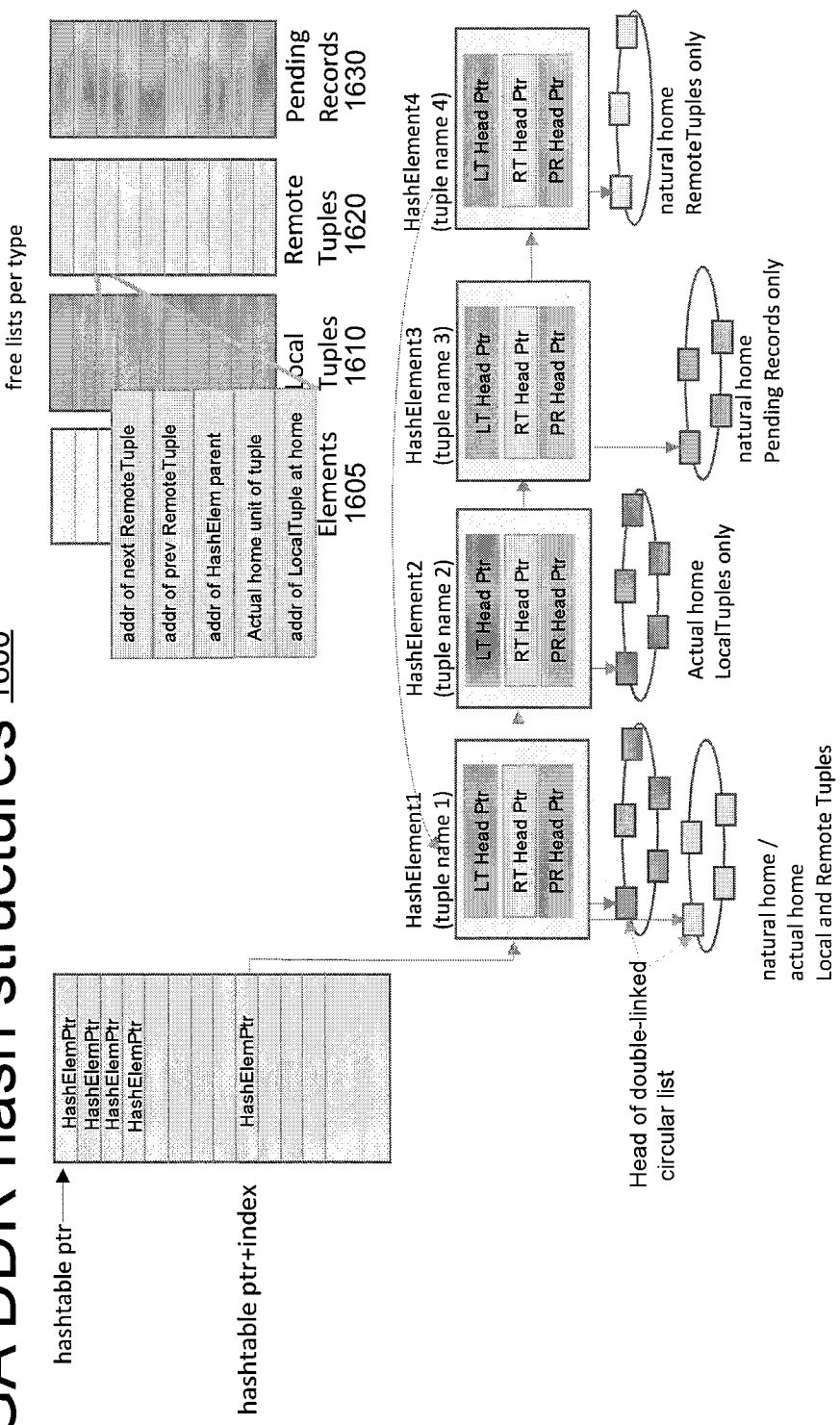

Referring to FIG. 19, this figure illustrates fields for an element in the remote tuples 1620: address of the next remote tuple (addr of next RemoteTuple); address of the previous remote tuple (addr of prev RemoteTuple); address of the hash element parent (addr of HashElem parent); actual home of the tuple (Actual home unit of tuple); and the address of the local tuple at the (actual) home (addr of LocalTuple at home).

Figure 20:
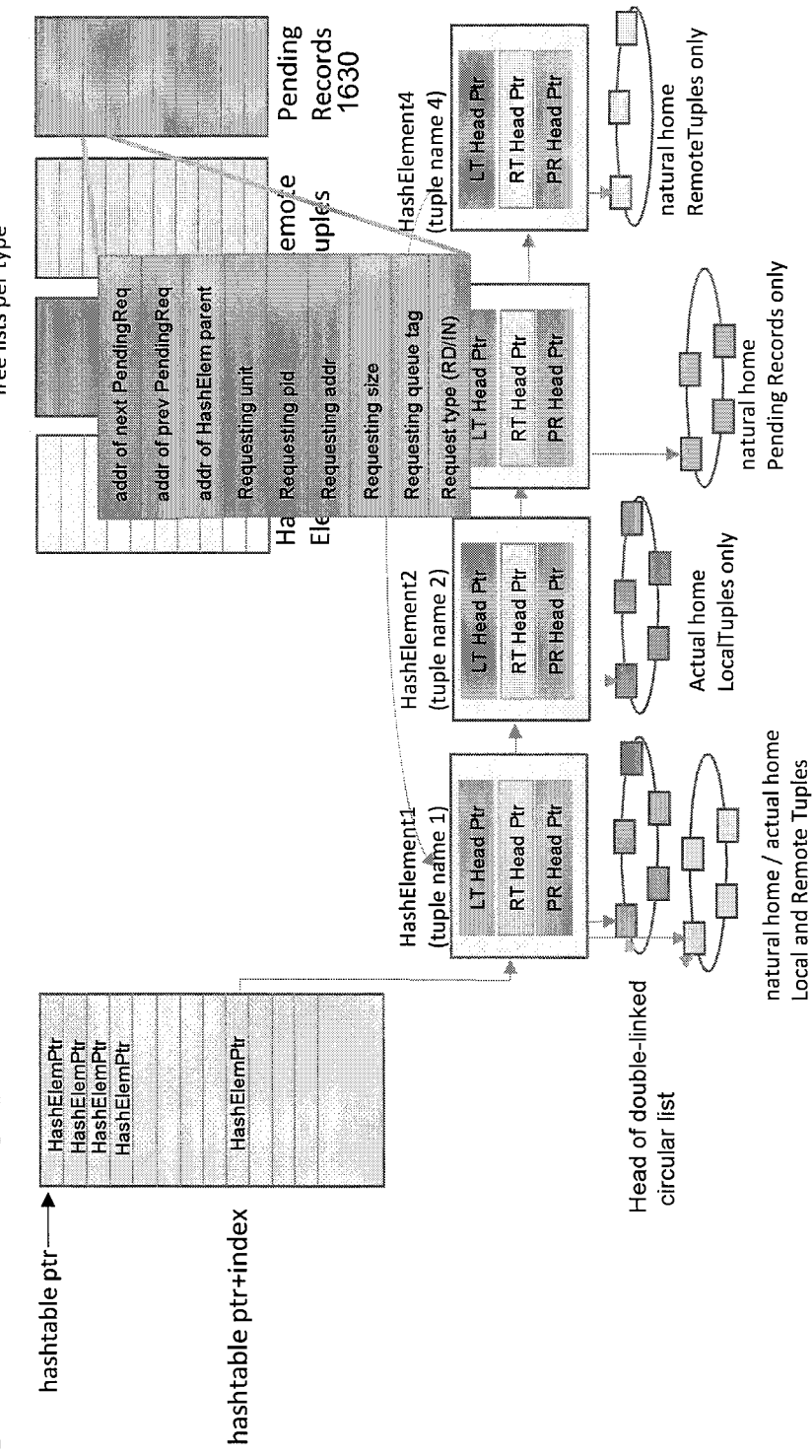

Referring to FIG. 20, this figure illustrates fields for an element in the pending records 1630: address of the next pending request (addr of next PendingReq); address of the previous pending request (addr of prev PendingReq); address of the hash element parent (addr of HashFlem parent); the requesting unit (Requesting unit); the requesting process ID (Requesting pid); the requesting address (Requesting addr); the requesting size (Requesting size); the requesting queue tag (Requesting queue tag); and the requesting type (Request type (RD/IN)). RD is short for csRd (read tuple without removing record from coordination namespace), see FIG. 14. Additionally, IN is short for csIn (read tuple and remove from coordination namespace), see also FIG. 14. Further, OUT is short for csOut (write tuple to coordination namespace), as described above. Pending records are created only for csRd and csIn operation when they are issued before the csOut was issued. If a matching tuple already exists, no pending record is created. This disclosure specifically does not require pending records, but such records are needed as part of CNS.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
performing one or more scatter gather operations by accessing a shared memory that is shared amongst multiple nodes interconnected through one or more networks, the shared memory comprising a coordination namespace that is shared amongst the multiple nodes, wherein tuples in the coordination namespace are accessed using at least tuple names associated with the tuples, the operations comprising:

gathering data from multiple processes at corresponding multiple nodes into one or more locations in the coordination namespace, and creating one or more tuples having a same tuple name in the coordination namespace, wherein the one or more tuples have information referencing the gathered data in the one or more locations and can be accessed using the same tuple name; or scattering data that has been gathered using the same tuple name to multiple processes participating in the coordination namespace, the scattering using the one or more tuples in the coordination namespace, the scattering performed from the one or more locations into other locations at one or multiple nodes for one or multiple processes at the corresponding one or multiple nodes; or performing both the gathering data and the scattering data.

2. The method of claim 1, wherein the one or more tuples having the same tuple name is a single tuple.

3. The method of claim 2, wherein the method is performed by a tuple space manager, and the gathering data is performed responsive to a command received by the tuple space manager from any one process that is participating in the coordination namespace, the parameters in the command comprising the same tuple name under which the data is to be gathered, a list of node identifiers (IDs), a list of process IDs, a list of addresses where data to be gathered is present, and a list of sizes of each data to be gathered from a corresponding address.

4. The method of claim 3, wherein the gathering data comprises the tuple space manager processing the information in the parameters, performing a remote memory access load to retrieve the data in the parameters to a temporary buffer, moving the retrieved data to a location in the coordination namespace, and releasing the temporary buffer in response to all the data in the parameters being retrieved and stored in the location, and wherein the creating updates the single tuple with information referencing the location.

5. The method of claim 2, wherein the method is performed by a tuple space manager, and the scattering data is performed responsive to a command received by the tuple space manager from any one process that is participating in the coordination namespace, the parameters in the command comprising the same tuple name under which data has been gathered, a list of addresses where the data needs to be scattered, a list of sizes of each data, and corresponding process identifiers that will receive the corresponding data.

6. The method of claim 5, wherein the scattering data further comprises the tuple space manager processing the received request and issuing memory transfers to move data from the location, determined based on the information in the single tuple, in the coordination namespace to a temporary buffer, triggering remote memory access calls to move data from the temporary buffer to different addresses in the command, and, in response to completion of moving all the data from the temporary butter to the different scatter addresses, releasing the temporary buffer.

7. The method of claim 1, wherein the scattering the data comprises scattering data that has been gathered using the same tuple name and into the one or more tuples to an array of adjacent memory locations for a single tuple name in the coordination namespace for a single process at a corresponding single node.

8. A method, comprising:
performing one or more scatter gather operations by accessing a shared memory that is shared amongst multiple nodes interconnected through one or more networks, the shared memory comprising a coordination namespace that is shared amongst the multiple nodes, the operations comprising:

gathering data from multiple processes at corresponding multiple nodes into one or more locations in the coordination namespace, and creating one or more tuples having a same tuple name in the coordination namespace, wherein the one or more tuples have information referencing the gathered data in the one or more locations; or scattering data that has been gathered using the same tuple name to multiple processes participating in the coordination namespace, the scattering using the one or more tuples in the coordination namespace, the scattering performed from the one or more locations into other locations at one or multiple nodes for one or multiple processes at the corresponding one or multiple nodes; or performing both the gathering data and the scattering data, wherein the locations in the coordination namespace are multiple locations, the one or more tuples having the same tuple name are multiple tuples, each of the multiple tuples having the same tuple name and linked with each other via a double-linked list, and each of the tuples comprises information referencing corresponding data gathered in one of the multiple locations.

9. The method of claim 8, wherein the method is performed by a tuple space manager, and the gathering data comprises the tuple space manager receiving commands from the multiple processes at the multiple nodes requesting the gathering of data, the commands comprising the same tuple name, and an address, size, and part number of data at a corresponding one of the multiple nodes.

10. The method of claim 9, wherein the gathering data comprises the tuple space manager processing the commands and gathering data into multiple locations, wherein a tuple having a reference to one of the multiple locations is created in the double-linked list, and wherein the part number is used to identify a corresponding tuple in the list.

11. The method of claim 10, wherein the multiple locations are stored either at a same aggregated location where all data is stored in contiguous memory addresses or spread out in multiple locations accessible using multiple separate memory addresses.

12. The method of claim 10, wherein the gathering data comprises the tuple space manager fetching data from the multiple nodes using remote memory accesses, placing the fetched data in a temporary buffer, moving the fetched data to corresponding ones of the multiple locations and updating corresponding ones of the tuple records in the double-linked list with references to the locations, and, in response to all of the commands being processed and the associated data being fetched and moved into the multiple locations, releasing the temporary buffer.

13. The method of claim 8, wherein the method is performed by a tuple space manager, wherein scattering data comprises the tuple space manager receiving commands from individual ones of the processes that need gathered data back, the commands having parameters comprising the same tuple name, and a data, address for the data, and part number of the data.

14. The method of claim 13, wherein scattering data comprises the tuple space manager processing the received commands, identifying corresponding tuples in the double-linked list by their corresponding part numbers, issuing memory access transfers to move data from the multiple locations using references in the tuples from the double-linked list to a temporary buffer, triggering remote memory access calls to move data to corresponding addresses in the requests, and, in response to completion of moving the data from the temporary buffer to the addresses in the request, releasing the temporary buffer.

15. An apparatus, comprising:
one or more memories having computer-readable code thereon; and
one or more processors, the one or more processors, in response to retrieval and execution of the computer-readable code, causing the apparatus to perform operations comprising:
performing one or more scatter gather operations by accessing a shared memory that is shared amongst multiple nodes interconnected through one or more networks, the shared memory comprising a coordination namespace that is shared amongst the multiple nodes, wherein tuples in the coordination namespace are accessed using at least tuple names associated with the tuples, the operations comprising:
gathering data from multiple processes at corresponding multiple nodes into a one or more locations in the coordination namespace, and creating one or more tuples having a same tuple name in the coordination namespace, wherein the one or more tuples have information referencing the gathered data in the one or more locations and can be accessed using the same tuple name; or
scattering data that has been gathered using the same tuple name to multiple processes participating in the coordination namespace, the scattering using the one or more tuples in the coordination namespace, the scattering performed from the one or more locations into other locations at one or multiple nodes for one or multiple processes at the corresponding one or multiple nodes; or
performing both the gathering data and the scattering data.

16. The apparatus of claim 15, wherein the one or more tuples having the same tuple name is a single tuple.

17. The apparatus of claim 16, wherein the computer-readable code comprises a tuple space manager, and wherein:
the gathering data is performed responsive to a first command received by the tuple space manager from any one process that is participating in the coordination namespace, the parameters in the first command comprising the same tuple name under which the data is to be gathered, a list of node identifiers (IDs), a list of process IDs, a list of addresses where data to be gathered is present, and a list of sizes of each data to be gathered from a corresponding address;
the scattering data is performed responsive to a second command received by the tuple space manager from any one process that is participating in the coordination namespace, the parameters in the second command comprising the same tuple name under which data has been gathered, a list of addresses where the data needs to be scattered, a list of sizes of each data, and corresponding process identifiers that will receive the corresponding data.

18. The apparatus of claim 15, wherein the scattering the data comprises scattering data that has been gathered using the same tuple name and into the one or more tuples to an array of adjacent memory locations for a single tuple name in the coordination namespace for a single process at a corresponding single node.

19. An apparatus, comprising:
one or more memories having computer-readable code thereon; and
one or more processors, the one or more processors, in response to retrieval and execution of the computer-readable code, causing the apparatus to perform operations comprising:
performing one or more scatter gather operations by accessing a shared memory that is shared amongst multiple nodes interconnected through one or more networks, the shared memory comprising a coordination namespace that is shared amongst the multiple nodes, the operations comprising:
gathering data from multiple processes at corresponding multiple nodes into one or more locations in the coordination namespace, and creating one or more tuples having a same tuple name in the coordination namespace, wherein the one or more tuples have information referencing the gathered data in the one or more locations; or
scattering data that has been gathered using the same tuple name to multiple processes participating in the coordination namespace, the scattering using the one or more tuples in the coordination namespace, the scattering performed from the one or more locations into other locations at one or multiple nodes for one or multiple processes at the corresponding one or multiple nodes; or
performing both the gathering data and the scattering data,
wherein the locations in the coordination namespace are multiple locations, the one or more tuples having the same tuple name are multiple tuples, each of the multiple tuples having the same tuple name and linked with each other via a double-linked list, and each of the tuples comprises information referencing corresponding data gathered in one of the multiple locations.

20. The apparatus of claim 19, wherein the computer-readable code comprises a tuple space manager, and wherein:
the gathering data comprises the tuple space manager receiving first commands from the multiple processes at the multiple nodes requesting the gathering of data, the first commands comprising the same tuple name, and an address, size, and part number of data at a corresponding one of the multiple nodes; and
the scattering data comprises the tuple space manager receiving second commands from individual ones of the processes that need gathered data back, the second commands having parameters comprising the same tuple name, and a data, address for the data, and part number of the data.

* * * * *